(12) United States Patent
Yokoi et al.

(10) Patent No.: US 11,700,214 B1
(45) Date of Patent: Jul. 11, 2023

(54) NETWORK INTERFACE AND BUFFER CONTROL METHOD THEREOF

(71) Applicant: Hitachi, Ltd., Tokyo (JP)

(72) Inventors: Nobuhiro Yokoi, Tokyo (JP); Hiroka Ihara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/896,204

(22) Filed: Aug. 26, 2022

(30) Foreign Application Priority Data

Mar. 24, 2022 (JP) ................................. 2022-048675

(51) Int. Cl.
*H04L 49/9047* (2022.01)
*H04L 49/90* (2022.01)

(52) U.S. Cl.
CPC ...... *H04L 49/9052* (2013.01); *H04L 49/9084* (2013.01)

(58) Field of Classification Search
None
See application file for complete search history.

(56) References Cited

U.S. PATENT DOCUMENTS 9,100,349 B2   8/2015 Balakavi et al.
10,999,223 B1 * 5/2021 Jain .................... H04L 49/9015

* cited by examiner

*Primary Examiner* — Alex Skripnikov
(74) *Attorney, Agent, or Firm* — Mattingly & Malur, PC

(57) ABSTRACT

A network interface includes a processor, memory, and a cache between the processor and the memory. The processor secures a plurality of buffers for storing transfer data in the memory, and manages an allocation order of available buffers of the plurality of buffers. The processor returns a buffer released after data transfer to a position before a predetermined position of the allocation order.

9 Claims, 18 Drawing Sheets

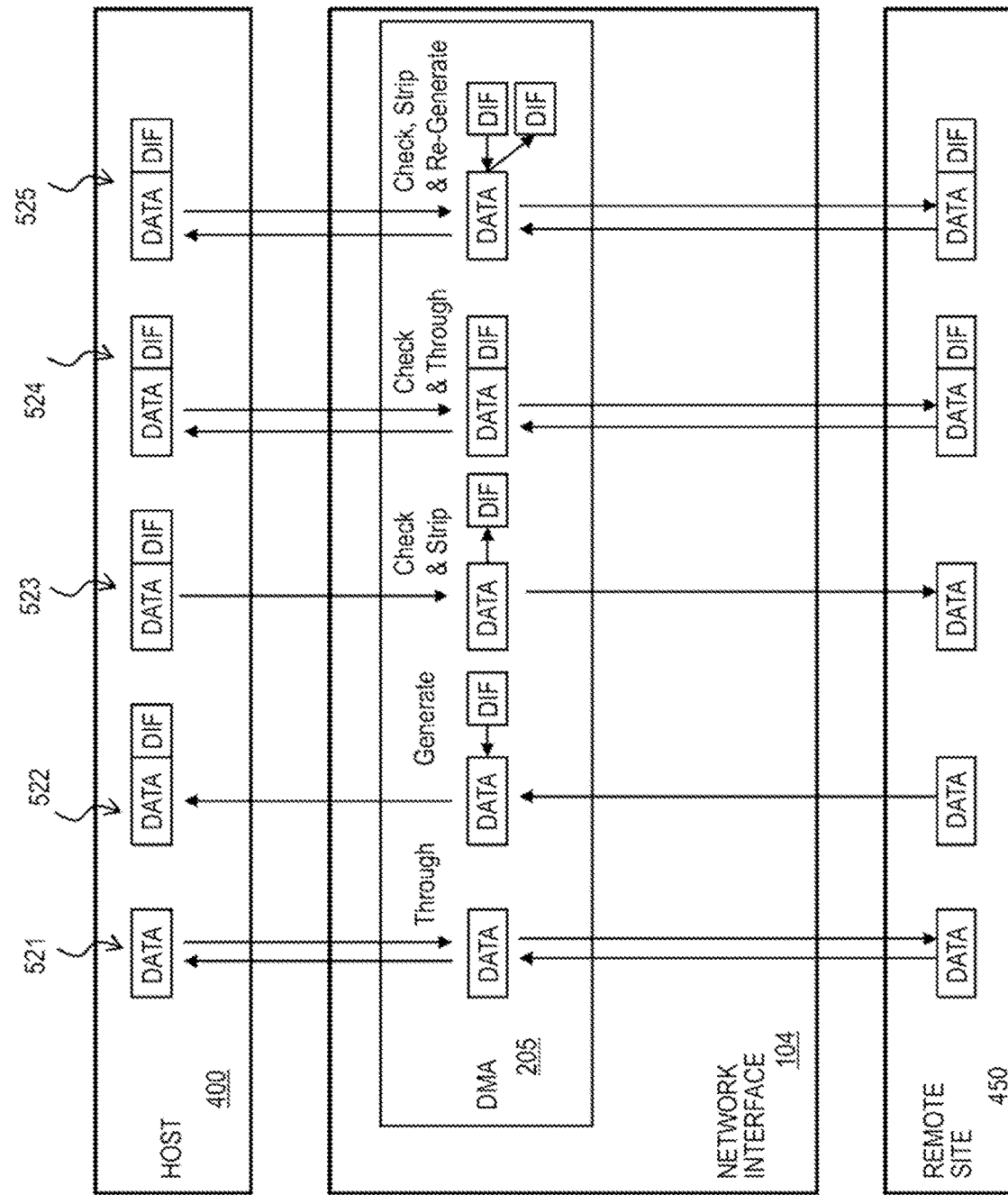

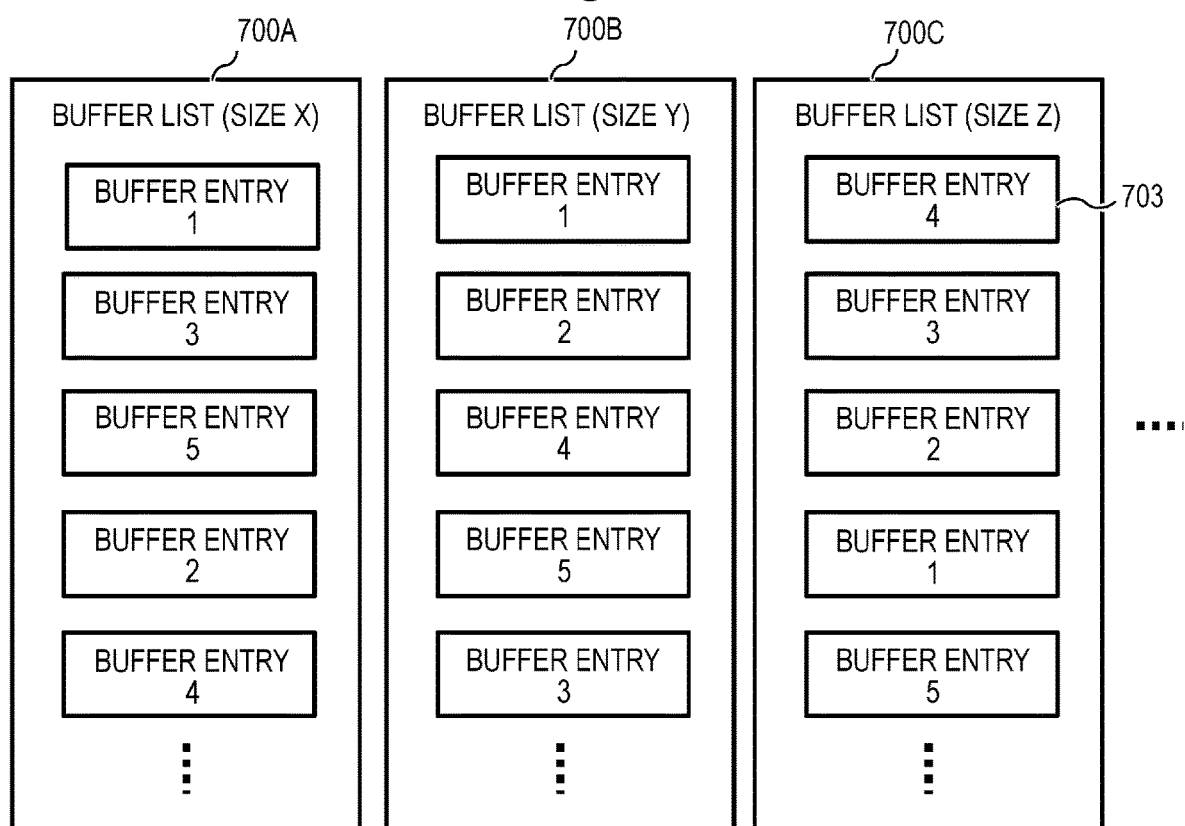

FIG. 8A
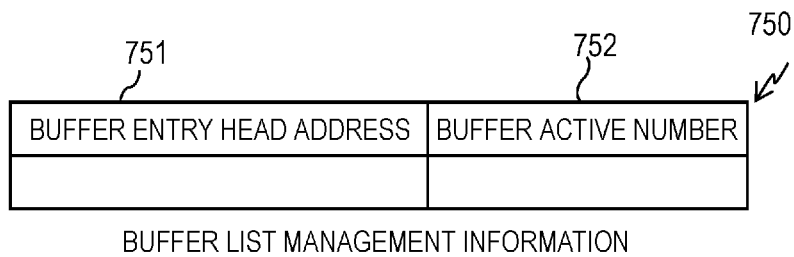
BUFFER LIST MANAGEMENT INFORMATION
FIG. 8B
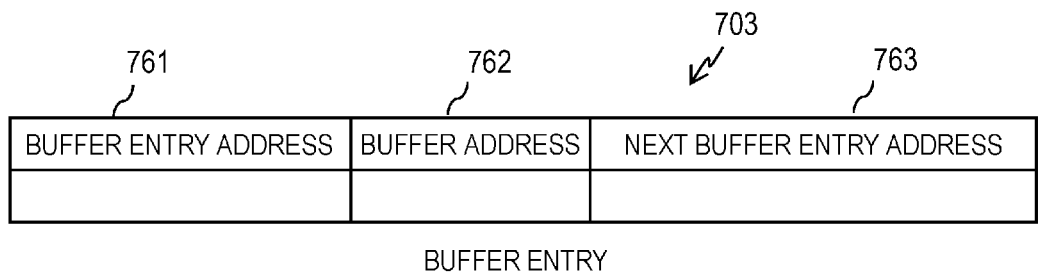
BUFFER ENTRY
FIG. 9
| 771 | 772 | 773 | 774 | 775 |
|---|---|---|---|---|
| BUFFER LIST | BUFFER SIZE | NUMBER OF BUFFERS | MAXIMUM ACTIVE NUMBER | CONTROL TYPE |
|  |  |  |  |  |
|  |  |  |  |  |
|  |  |  |  |  |
BUFFER MANAGEMENT TABLE

NETWORK INTERFACE AND BUFFER CONTROL METHOD THEREOF

CLAIM OF PRIORITY

The present application claims priority from Japanese patent application JP 2022-048675 filed on Mar. 24, 2022, the content of which is hereby incorporated by reference into this application.

BACKGROUND OF THE INVENTION

1. Field of the Invention

The present invention relates to a network interface.

2. Description of Related Art

An information system and a storage system are configured with, for example, a server system on which a user application and the like operates, a storage controller that manages data to be stored and improves reliability, and a drive box that stores a plurality of drives that store and hold data used in the server system.

The storage system receives a request from the server system, and in the case of a read request, for example, a storage controller reads data from a drive in the drive box and transfers the data to the server system.

In the related art, fibre channel (FC) network is the mainstream for the front-end network of the storage controller for enterprise products, and serial attached SCSI (SAS) network is the mainstream for the back-end network. The drive box is Just a Bunch Of Disks (JBOD), and generally has a configuration in which a plurality of SAS/SATA drives for storing data are mounted in a slot of the drive box.

In recent years, in order to improve the performance of the storage system, the adoption of a flash drive such as a solid state drive (SSD), which is a high-performance drive, has progressed and an optimum non-volatile memory express (NVMe) protocol for accessing the flash drive has been standardized. Furthermore, the NVMe over Fabrics (NVMe-oF) standard, which allows the NVMe protocol to be used over the Internet Protocol (IP), has appeared for high expandability of drive connections in the back-end network.

The idea of End-to-End-NVMe-oF, which applies the NVMe-oF to the front-end network and makes all connections from the server system to the drive box via the storage controller compliant with the NVMe-oF, is becoming widespread. A drive box (FBOF: fabric-attached bunch of flash) equipped with a flash drive compatible with the NVMe-of and a composable storage that connects a plurality of storage controllers via a network have appeared, and the use of IP connection is expanding in the field of enterprise storage.

Due to the speeding up of networks and the appearance of new protocols (NVMe-oF and the like), even in enterprise storage systems, speeding up of network interfaces and multi-protocol support are required. In the related art, the CPU on the storage controller is used, or each protocol is offloaded to dedicated hardware to support a plurality of protocols. For example, U.S. Pat. No. 9,100,349 discloses a technology that supports a plurality of protocols with one network interface card (NIC) equipped with both Ethernet and FC protocol chips.

However, the use of the CPU on the storage controller has a problem that the CPU resource is consumed in protocol processing. A channel board (CHB) equipped with an ASIC dedicated to protocol processing requires the development of a dedicated ASIC for each protocol, and has difficulty in timely protocol support.

On the other hand, there are changes in network interface devices, and SmartNIC, which has a built-in general-purpose processor and memory, operates an operating system, runs software on the operating system, and processes network protocols, has appeared. In SmartNIC, for example, the same operating system that runs on the server system can be operated, and a software protocol stack, applications, and the like used therein can be operated. Since processing can be implemented by software, it is possible to flexibly support a plurality of protocols, an immediate response to a new protocol, and an update of protocol processing.

By implementing the protocol processing by software using SmartNIC, which is a NIC equipped with a general-purpose CPU and memory, a protocol processing load can be offloaded from the storage controller while flexibly supporting the plurality of protocols.

However, the SmartNIC has limitations on types of memory chips to be mounted, the number of mounted memory chips, and the wiring of the memory chips to be mounted due to the restrictions on a board area for mounting on the storage controller and the restrictions on the power limitation of an interface of the storage controller.

For example, like iSCSI and NVMe TCP, a protocol that is designed to transfer data as a TCP/IP packet, temporarily place the packet in the SmartNIC memory, and require a plurality of pieces of memory access processing may not be able to realize a configuration that achieves the required memory performance. Therefore, the memory may become a bottleneck of performance and the desired performance may not be obtained.

SUMMARY OF THE INVENTION

A network interface according to a representative embodiment of the present invention includes a processor, a memory, and a cache between the processor and the memory. The processor secures a plurality of buffers for storing transfer data in the memory, manages an allocation order of available buffers of the plurality of buffers, and returns a buffer released after data transfer to a position before a predetermined position of the allocation order.

According to the representative embodiment of the present invention, it is possible to suppress performance degradation due to a memory bottleneck in the network interface. Problems to be solved, configurations and effects other than those described above will be clarified by the description of the following embodiments.

BRIEF DESCRIPTION OF THE DRAWINGS

FIG. 6B is a diagram illustrating some aspects of data transfer;

FIG. 7 illustrates a configuration example of a buffer list;

FIG. 8A illustrates buffer list management information included in the buffer list;

FIG. 8B illustrates information held by a buffer entry;

FIG. 9 illustrates a configuration example of a buffer management table;

DESCRIPTION OF EMBODIMENTS

Figure 1:
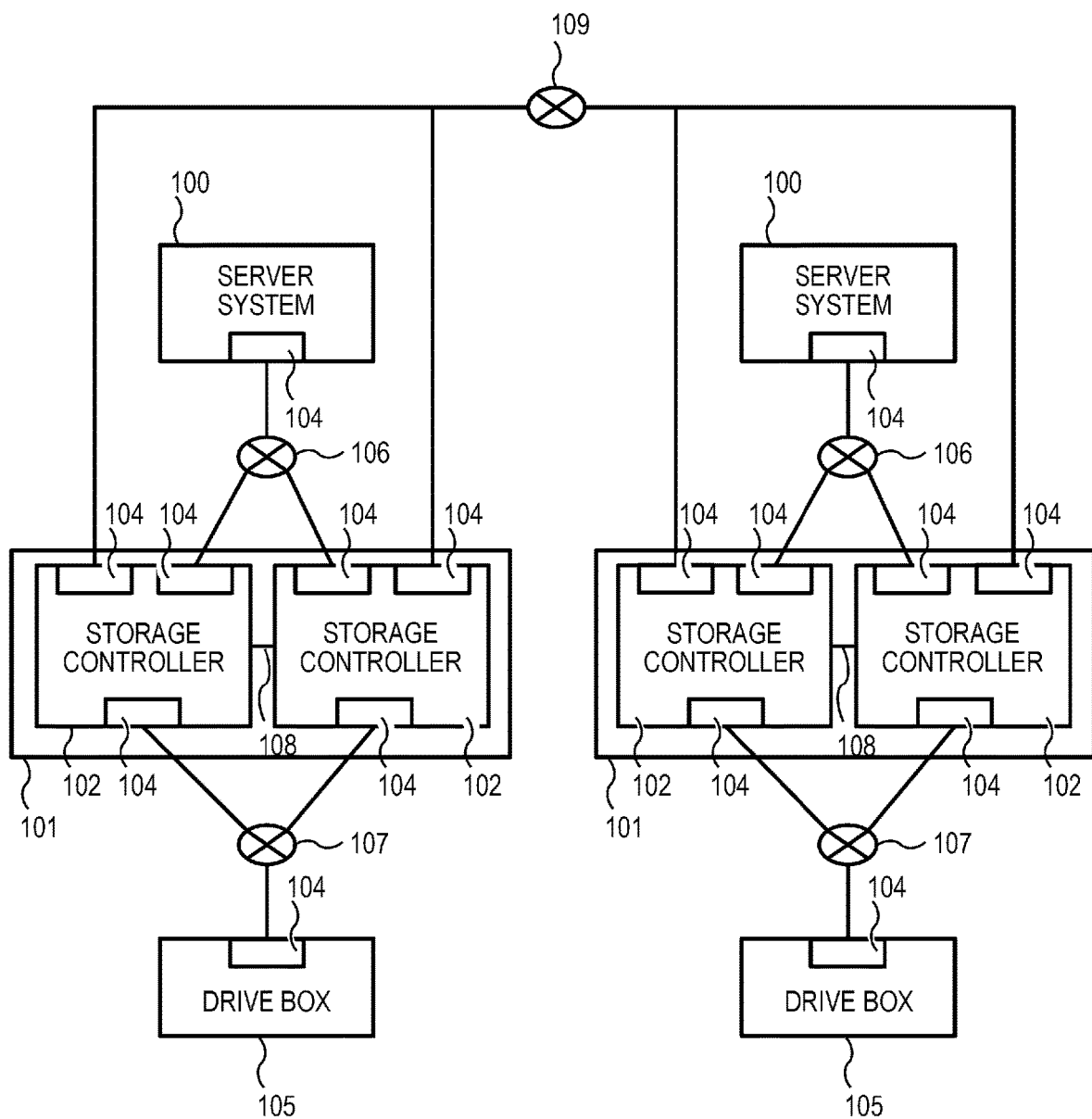
FIG. 1 is a diagram illustrating a configuration example of an information processing system.

Hereinafter, embodiments will be described with reference to the drawings. The following description and drawings are examples for describing the present invention, and are appropriately omitted and simplified for the sake of clarification of the description. The present invention can be carried out in various other forms, and each component may be singular or plural, unless otherwise specified.

The embodiments described below do not limit the invention according to the claims, and not all combinations of elements described in the embodiments are essential to the solution of the invention.

In the following description, various information may be described by expressions such as "table", "list", and "queue", but various information may be expressed by a data structure other than these, and in order to show that various information does not depend on the data structure, "table of xxx", "list of xxx", "queue of xxx", and the like may be referred to as "xxx information" and the like. In the following description, when describing identification information, expressions such as "identification information", "identifier", "name", "ID", and "number" are used, but these expressions can be replaced with each other.

In the following description, when there are a plurality of components having the same or similar functions, the components are basically described with the same reference numerals, but even if the functions are the same, the means for realizing the functions may be different. Furthermore, the embodiments described later may be implemented by software running on a general-purpose computer, or may be implemented by dedicated hardware or a combination of software and hardware.

In the following description, processing may be described with "program" as the subject, but since the program is executed by a processor (for example, CPU: Central Processing Unit) and performs specified processing while appropriately using a storage resource (for example, memory) and/or an interface device (communication port), and the like, a processing entity may be described as the processor.

The processing described with the program as the subject may be processing performed by a computer (for example, a computer host, a storage device) including the processor. In the following description, the expression "controller" may refer to a processor or a hardware circuit that performs a part or all of the processing performed by the processor.

The program may be installed on each computer from a program source (for example, a program distribution server or a storage medium that can be read by a computer). In this case, the program distribution server includes a CPU and a storage resource, and the storage resource further stores a distribution program and a program to be distributed, and the CPU executes the distribution program, so that the CPU of the program distribution server may distribute the program to be distributed to other computers.

In the following description, two or more programs may be realized as one program, or one program may be realized as two or more programs.

In the following description, a storage drive or simply a drive means a physical storage device, and may typically be a non-volatile storage device (for example, auxiliary storage device). The drive may be, for example, a hard disk drive (HDD) or a solid state drive (SSD). Different types of drives may be mixed in the storage system.

In the following description, the drive has a VOL, and "VOL" is an abbreviation for a volume, and may be a physical storage device or a logical storage device. The VOL may be a real VOL (RVOL) or a virtual VOL (VVOL). The "RVOL" may be a VOL based on a physical storage resource (for example, one or more RAID groups) included in the storage system including the RVOL.

The "VVOL" may be any of an external connection VOL (EVOL), a capacity expansion VOL (TPVOL), and a snapshot VOL. The EVOL is based on a storage space (for example, VOL) of an external storage system and may be a VOL according to a storage virtualization technology. The TPVOL may be a VOL that is composed of a plurality of virtual areas (virtual storage areas) and that follows a capacity virtualization technology (typically thin provisioning).

In the following description, the VOL recognized by the host (VOL provided to the host) is referred to as "LDEV". In the following description, the LDEV is the TPVOL (or RVOL) and a pool is a TP pool. However, the features of the present disclosure can also be applied to a storage device that does not employ the capacity expansion technology (thin provisioning).

The "pool" is a logical storage area (for example, a set of a plurality of pool VOLs), and may be prepared for each application. For example, the pool may be the TP pool. The TP pool may be a storage area composed of a plurality of pages (real storage areas). If the page is not allocated to a virtual area (virtual area of TPVOL) to which an address, which is designated by a write request received from a host computer (hereafter, host), belongs, the storage controller allocates (even if a page has already been allocated to the write destination virtual area, a page may be newly allocated to the write destination virtual area) the page from the TP pool to the virtual area (write destination virtual area). The "pool VOL" may be a VOL that is a component of the pool. The pool VOL may be the RVOL or the EVOL.

In the following description, the VOL may be "logical unit (hereinafter, LU)" in SCSI or "name space (hereinafter, NS)" in NVMe.

In the following description, a "RAID" is an abbreviation for redundant array of inexpensive disks. A RAID group is composed of a plurality of drives (typically, the same type of drives) and stores data according to a RAID level associated with the RAID group. The RAID group may be referred to as a parity group. The parity group may be, for example, a RAID group that stores parity.

A network interface device (hereinafter, also simply referred to as a network interface) of one embodiment of this specification may be implemented by an information processing system including the server system and the storage system. The storage system can include the storage controller and a drive box. The network interface can include, for example, a general-purpose processor, a memory, a network controller, and an interface with a host system.

A configuration using the general-purpose processor and memory capable of realizing software-based protocol processing solves the problem that hardware needs to be updated every time the support for a new protocol such as NVMe-oF is increased in addition to iSCSI. The network interface follows changes by replacing software of the network interface, by using the general-purpose processor, the memory, and the like, so that the network interface can respond quickly even if there is a change from iSCSI to NVMe-oF, a change due to an NVMe-oF specification update, or a change from a new protocol to a newer protocol. The network interface of one embodiment of this specification simultaneously supports a plurality of pieces of protocol processing.

In order to reduce memory access in the protocol processing, in the network interface of one embodiment of this specification, a part or all of the following methods can be adopted for data buffer control for storing data dominant in a memory access factor in the protocol processing.

The network interface uses buffers having a plurality of sizes. The buffer size is set according to a transfer data size of a supported protocol, and for example, a plurality of data buffers are secured for each supported transfer data size. The data buffer is secured in a list structure at the time of initialization (startup), for example.

For example, the network interface secures a plurality of buffers having a size of 8 KB, 256 KB, and the like at the time of startup. With this configuration, different buffers can be used for short data length and long data length while reducing a buffer securing load during I/O. When a transfer request with a large number of short data lengths comes, an amount of memory to be used can be reduced, and when a transfer request with the long data length comes, a load of marking off a list can be reduced by not using a large number of buffers.

The network interface of one embodiment of this specification selects a recently used area when selecting the data buffer. The network interface manages the data buffers by the list so that the buffer released immediately before is used for the next processing. With this configuration, an access range to the data buffer can be localized and a cache hit ratio can be increased. By reducing the number of memory accesses by making the cache hit of transfer data to occur, the problem of performance degradation due to the memory bottleneck is solved.

The network interface of one embodiment of this specification controls command processing that can be started up from a difference between a cache capacity and a total active buffer use amount. The network interface limits the number of buffers used for data transfer to be processed at the same time so that data does not overflow from the cache as much as possible. With this configuration, a frequency of cache hits can be increased, the memory access can be reduced, and performance deterioration due to band congestion of the memory can be prevented.

FIG. 1 is a diagram illustrating a configuration example of an information processing system according to one embodiment of this specification. The information processing system includes one or more server systems 100 and a storage system. The storage system includes one or more storage devices 101 and one or more drive boxes 105.

The storage device 101 includes one or more storage controllers 102. In the configuration example of FIG. 1, each storage device 101 includes two storage controllers 102. The storage controller 102 is connected to one or more server systems 100 via a front-end network 106.

A drive box 105 is equipped with one or more drives and is connected to one or more storage controllers 102 via a back-end network 107. In addition to a short-distance connection by an inter-storage controller network 108, the storage controller 102 is connected to another storage controller 102 at a medium or long distance via an external network 109.

The server system 100 is a host machine on which a user application and the like operates, includes one or more processors, and is configured to include a memory and one or more storage devices of an auxiliary storage apparatus. For example, a database or Web service operates on the server system 100, and the server system 100 writes and reads data created from the database or Web service to the storage controller 102 via a network interface 104. The server system 100 is connected to the storage controller 102 via the front-end network 106, and has the network interface 104 as an interface device thereof. The server system 100 may be configured with a plurality of server groups, each of which may have the network interface 104 and may be connected to the storage controller 102 or another server system 100.

In order to provide the server system 100 with a function as storage, the two storage controllers 102 in the storage device 101 form redundant controllers. Each of the storage controllers 102 includes one or more processors and one or more storage devices. The storage controllers 102 in the storage device 101 have the same configuration.

Each of the storage controllers 102 includes one or more processors, and a core of each processor instructs to transfer data stored in the corresponding drive box 105 in response to a read command or a write command from the server system 100. The memory of the storage controller 102 is configured with, for example, a semiconductor memory such as a synchronous dynamic random access memory (SDRAM). The memory may be configured in combination with a volatile memory and a non-volatile memory such as a storage class memory (SCM).

The memory stores an execution program (storage control program and the like), a management table referenced by the processor, and the like, as a main memory of the processor. The memory is also used as a disk cache (cache memory) of the storage controller 102. The storage controller 102 has the network interface 104 as an interface device for the drive box 105. The network interface 104 communicates information on processing related to data transfer instructed by the server system 100 or storage processing such as data copy with the drive box 105.

The drive box 105 is equipped with a plurality of drives such as SSDs and HDDs, and includes an internal switch for connecting the plurality of drives and the storage controller 102, and a processor and a memory used for transfer processing. The drive box 105 receives, stores, and holds data generated by the server system 100 via the storage controller 102.

In order to secure availability of the data held in the drive box 105, the RAID may be formed between the built-in drives, or the RAID may be formed between a plurality of drive boxes 105. The drive box 105 is connected to the storage controller 102 via the back-end network 107, and has the network interface 104 as an interface device thereof.

The network interface 104 is a device mounted in each of the server system 100, the storage controller 102, and the drive box 105, and serves as a connection interface between various devices and various networks.

The network interface 104 may be, for example, a SmartNIC. Various functions of SmartNIC are carried out by using a general-purpose processor equipped with SmartNIC and some hardware offload engines. The SmartNIC may be configured by using a field programmable gate array (FPGA), and in that case, each function is realized on the FGPA. Furthermore, as another form, the SmartNIC may be configured as dedicated interface hardware in which the SmartNIC is implemented entirely by hardware. Details of the network interface 104 will be described later.

The front-end network 106 is a storage area network that connects the storage controller 102 and the server system 100, and for example, an IP network such as iSCSI or NVMe over Fabrics (NVMe-oF) is utilized. The back-end network 107 is a network that connects the storage controller 102 and the drive box 105, and for example, an IP network such as iSCSI or NVMe-oF is utilized.

The inter-storage controller network 108 is a network used for redundancy of the storage controller 102, and is configured with a wide band interconnect. By using the network, write data are duplicated and metadata are shared, and even if one storage controller 102 is blocked due to maintenance or a failure, storage processing can be continued by the other storage controller 102.

The external network 109 is a wide area network (WAN) or a local area network (LAN), for example, a network such as Ethernet (registered trademark) for the data link layer, Internet protocol for the Internet layer, and TCP, UDP and the like for the transport layer, and performs communication using protocol data units (PDUs) of iSCSI and NVMe-oF. The network can take the form of an internet line or a dedicated line. When communication delay increases according to the distance and network equipment is not configured only with lossless equipment, an occurrence rate differs depending on a type of the line, but an occurrence of packet loss is expected.

The information system and the storage system may include those other than components shown here. For example, network equipment such as a switch and a router may be connected to each network, or devices for monitoring and maintenance may be connected to each network. Further, it may be configured to connect to a storage service on the public cloud via the external network 109.

The network interface 104 of the server system 100 has initiator software in iSCSI or NVMe-oF for reading and writing data of the drive box 105 via the storage controller 102. In contrast, the network interface 104 of the storage controller has target software.

The network interface 104 of the storage controller 102 has initiator software in iSCSI or NVMe-oF for reading and writing data of the drive box 105. In contrast, the network interface 104 of the drive box 105 has target software.

Furthermore, the network interface 104 of the storage controller 102 has initiator software in iSCSI or NVMe-oF for reading and writing data of another storage device 101. In contrast, the network interface 104 of the other storage device 101 has target software.

A part of the network interface 104 may be a NIC that does not have the functionality of the SmartNIC. For example, the network interface 104 in the server system 100 operates as an initiator in the NIC, and the network interface 104 in the storage controller 102 operates as a target in SmartNIC.

Figure 2:
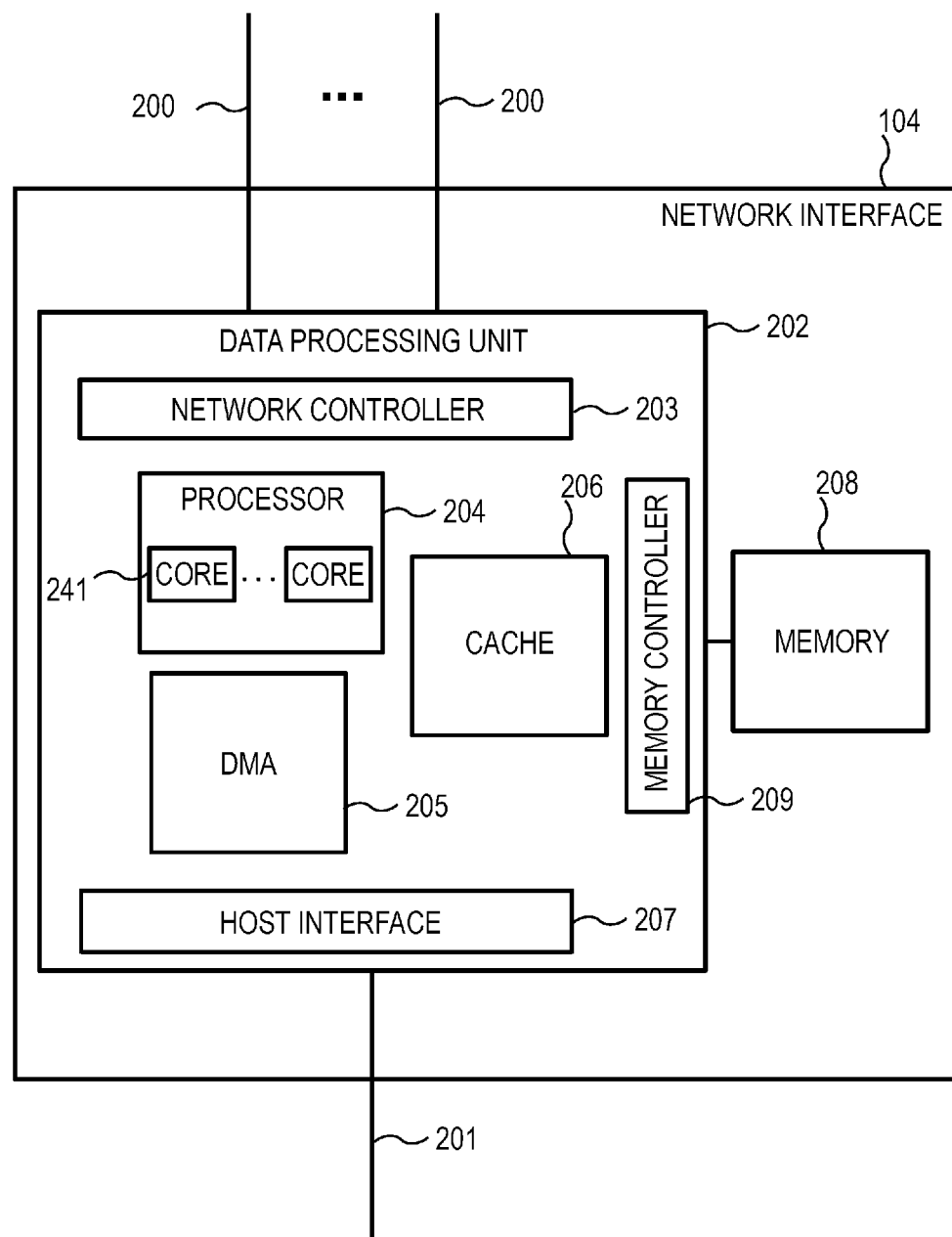
FIG. 2 is a diagram illustrating a configuration example of a network interface.

FIG. 2 is a diagram illustrating a configuration example of the network interface 104 according to one embodiment of this specification. The network interface 104 is connected to equipment equipped with the network interface 104, for example, an internal configuration of the storage controller 102 or the server system 100, the drive box 105, and the like, via a host bus 201. The network interface 104 is connected to other equipment via a network path 200, for example, by IP network connection.

The network interface 104 includes a data processing unit 202 and a memory 208. The data processing unit 202 includes a host interface 207 for connecting to the host bus 201 and a network controller 203 for connecting to the network path 200 to process a network protocol. Furthermore, the data processing unit 202 includes a processor 204, a memory controller 209, a direct memory access (DMA) controller 205, and a cache 206.

The host bus 201 is a bus that connects the network interface 104 to the storage controller 102, the server system 100, the drive box 105, and the like. The host bus 201 is a wideband, high-speed interconnect, and is configured to be connected to, for example, a processor of the installed equipment by PCIe.

The host interface 207 is an interface for connecting the network interface 104 and the host system (hereinafter, also simply referred to as a host) via the host bus 201. For example, when the host bus 201 is PCIe, the host interface 207 can include PHY of PCIe. The DMA controller 205 exchanges data between the memory 208 in the network interface 104 and the memory of the host.

The network path 200 is, for example, an IP network path and takes a network form of the WAN, the LAN, or a storage area network (SAN). The network interface 104 performs communication via one network path 200, or two or more network paths 200 in consideration of redundancy.

The network controller 203 is an interface for connecting the network interface 104 to the network path 200. The network controller 203 executes, for example, processing of a physical layer such as PHY, and stateless processing of a data link layer, an Internet layer, and a transport layer. The network controller 203 performs a checksum and frame processing, for example.

The network controller 203 supports, for example, Ethernet, IP, TCP, UDP, and the like. Furthermore, the network controller 203 may include an offload engine such as an internet security protocol (IPsec), transport layer security (TLS), data integrity field (DIF). The network controller 203 has a configuration that supports connection with an optical cable, a copper cable, and the like.

The processor 204 is, for example, the general-purpose processor and executes, for example, an operating system that is also used in the server system 100 and the like. The processor 204 further executes other software to perform processing such as protocol processing, command processing, and management of the network interface 104. The processor 204 can have any configuration, and can include, for example, one or more CPUs or micro processing units (MPUs) and one or more cores 241.

The memory 208 is configured with, for example, a semiconductor memory such as the SDRAM, and may be configured in combination with a non-volatile memory such as the SCM. The memory 208 stores an execution program (instruction codes for protocol processing and command processing), the management table referenced by the processor, and the like, as a main memory of the processor 204. The memory 208 is also used as a buffer for a command and data to be transmitted and received to and from the network. Furthermore, the memory 208 forms a queue interface with the network controller 203 and the host interface 207, and stores a descriptor and index of the queue.

The memory controller 209 is an interface for controlling the memory when reading and writing data of the memory 208. The memory controller 209 may be built in, for example, the processor 204, the data processing unit 202, or the network interface 104.

The cache 206 temporarily stores data between the memory 208 and the processor 204. The processor 204 can access the cache 206 faster than the memory 208. Data read from the memory 208 is stored in the cache 206. The processor 204 accesses the cache 206 before the memory 208 to read data (including commands). The cache 206 can have a hierarchical structure. The cache is called L1 cache, L2 cache, and the like from a hierarchy closer to the processor. The processor 204 and DMA controller 205 secure coherency (have consistency) with respect to the cache 206.

The information system and storage system may include those other than components shown here, and may be supplemented with, for example, modules and interfaces for monitoring and maintenance, and a non-volatile storage device in which an operating system and software program running on the network interface 104 are stored.

Figure 3:
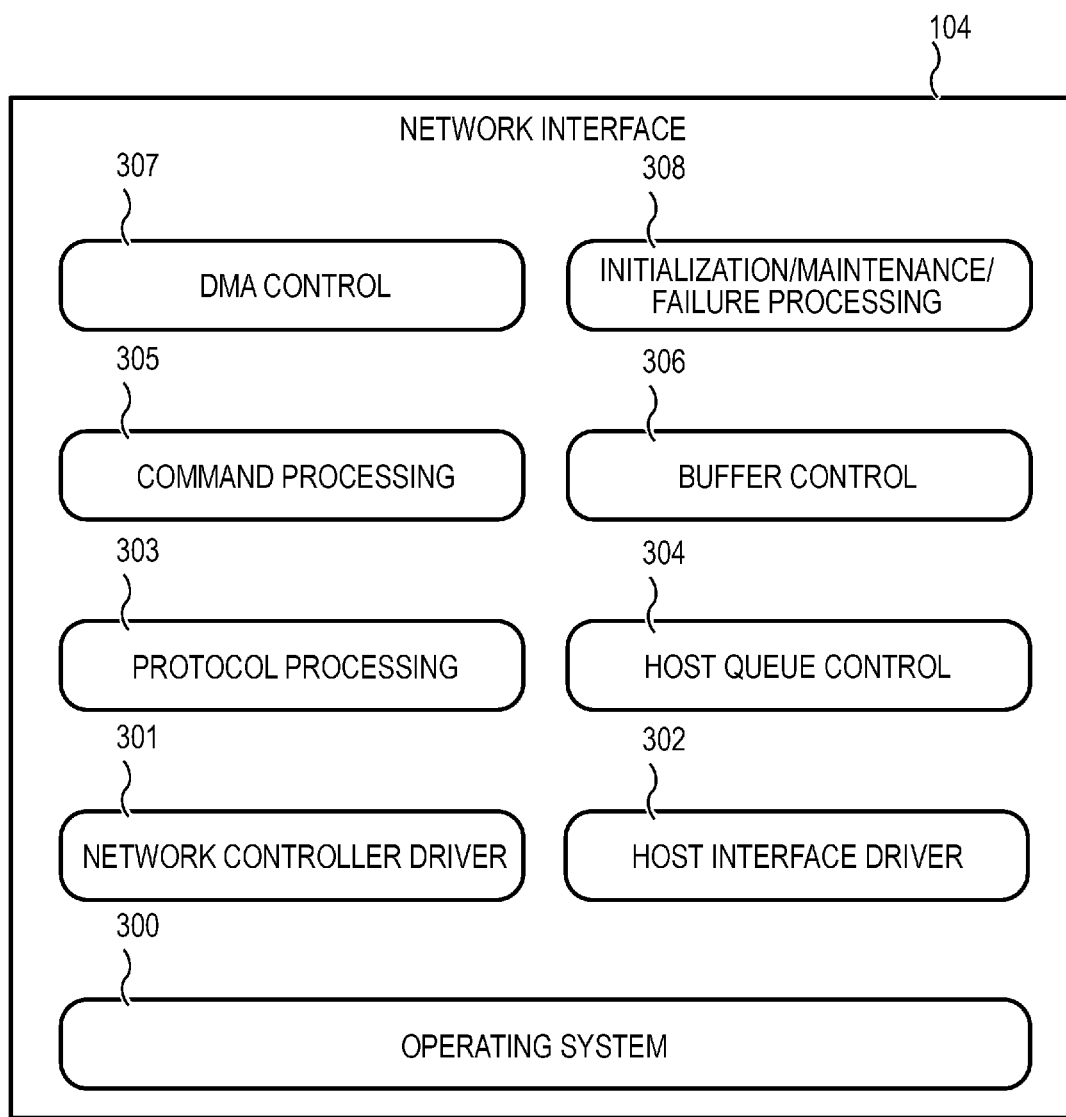
FIG. 3 is a diagram illustrating a configuration of programs of the network interface.

FIG. 3 is a diagram illustrating a configuration of programs of the network interface 104 according to one embodiment of this specification. In order to realize software-based changeable processing functions, the network interface 104 uses the general-purpose processor 204, the cache 206, and the memory 208 to operate an operating system 300, and then makes software programs for various processing operate on the operating system 300.

The software programs 300 to 308 are loaded into the memory 208 and processed by the processor 204. Some instructions are stored in the cache 206. Processing parts such as the DIF, cyclic redundancy check (CRC), encryption, compression, hashing, and parity processing, which are more efficient in hardware, may be implemented by hardware and controlled by software.

The operating system 300 is a basic software program that is a basis for operating the network interface, and manages the entire network interface. The operating system 300 provides a common usage environment for each software that operates on the processor of the network interface. The operating system 300 may be an embedded operating system or a general-purpose operating system that runs on a server, such as Linux (registered trademark).

A network controller driver 301 is driver software for controlling the network controller 203. The network controller driver 301 passes a parameter set of packet processing to be offloaded when a packet is generated or received to the network controller 203. Furthermore, the network controller driver 301 passes the packet generated by protocol processing 303 to the network controller 203 for transmission. The network controller driver 301 passes a packet received from the network controller 203 to the protocol processing 303.

A host interface driver 302 is driver software for controlling the host interface 207. Communication between the network interface 104 and the host is executed via the host interface driver 302.

The protocol processing 303 cooperates with the command processing 305, DMA control 307, and the network controller driver 301 to generate a transmission packet and perform transmission processing thereof. The protocol processing 303 processes the received packet, extracts control information, information and data on the iSCSI PDU, the NVMe-oF PDU, and the like, and passes the extracted information to the command processing 305.

The protocol processing 303 performs IP header processing of the Internet protocol layer, TCP header processing and UDP header processing of the transport layer, and iSCSI processing and NVMe-oF processing. For example, the protocol processing 303 executes a socket program or a program such as an iSCSI initiator or target, an NVMe-oF initiator or target.

A host queue control 304 is software for controlling a queue interface for exchanging commands with the host. The host queue control 304 manages an internal queue of commands transmitted to the host and an internal queue of commands received from the host in the network interface 104. The host queue control 304 stores commands to the host or commands from the host in the internal queues. The host queue control 304 controls Head and Tail when the internal queue has a ring structure, for example. The host queue control 304 controls the Head and Tail of command queues held by the host.

The command processing 305 receives a command for controlling the network interface 104 from the host and controls the network interface 104. The command processing 305 receives a processing request of the network protocol from the host, starts the protocol processing 303, and responds to the host with a processing result of the protocol processing 303. The command process 305 starts the DMA control 307 and performs response processing for data transfer with the memory secured by the host. Furthermore, the command process 305 performs initial settings and setting changes, software replacement of the network interface 104, notification to the host in the event of a failure, and the like.

A buffer control 306 is software for controlling the buffer that temporarily holds data in the memory 208. The buffer stores data received from the network and transferred to the host, or data received from the host and transmitted to the network. The buffer control 306 secures, uses, and manages buffer groups having a plurality of different sizes. The buffer control 306 controls the buffer so that the cache hit ratio is improved. Details of this point will be described later.

The DMA control 307 performs interface processing with DMA hardware in order to control data transfer between the memory secured on a host side and the memory 208 on the network interface 104, for example.

Initialization/maintenance/failure processing 308 performs initialization processing of hardware configuring the network interface 104 and initialization processing of various software. The initialization/maintenance/failure processing 308 supports software updates for the network interface 104, detection of hardware failures, notification to the host, and the like.

Figure 4:
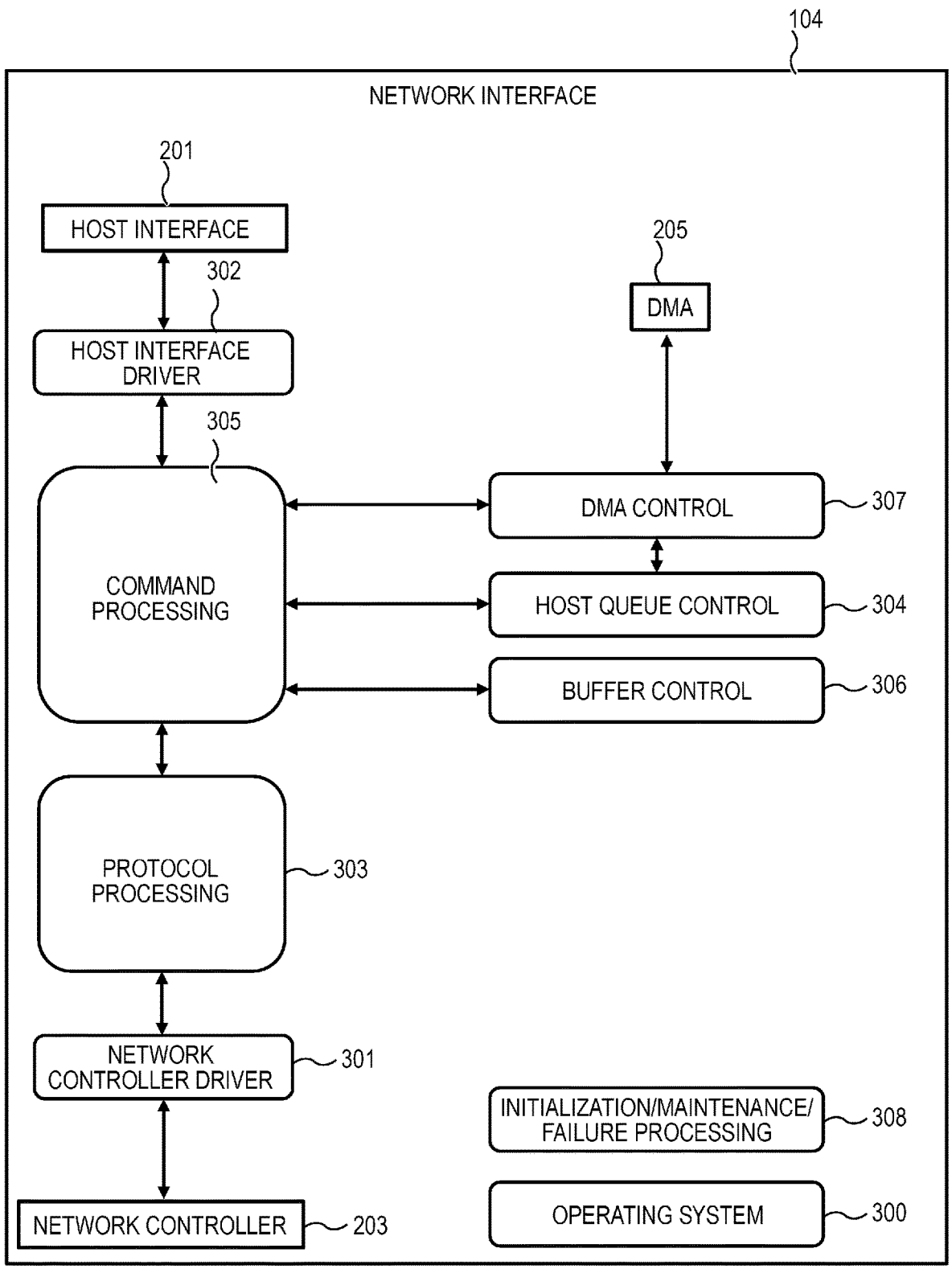
FIG. 4 is a diagram illustrating an example of a relationship between programs of the network interface.

FIG. 4 is a diagram illustrating an example of a relationship between the programs of the network interface 104 illustrated in FIG. 3. In the network interface 104, the operating system 300 operates and each software program operates on the basis of the operating system 300. By the initialization/maintenance/failure processing 308, the network interface 104 executes initial setting, maintenance such as software update, failure processing, and the like. The failure processing includes, for example, failure detection and collection of dump trace information such as statistical information and error information.

The network controller driver 301 controls the network controller 203, stores the transmission packet with respect to a packet buffer of the network controller 203, and acquires a reception packet from the packet buffer. The network controller driver 301 also makes settings for offloading frame processing of the data link layer, the Internet protocol layer, the transport layer, stateless processing, for example, a checksum calculation and the like.

Upon receiving an operation of the network controller driver 301, the protocol processing 303 performs network protocol processing such as IP, TCP, UDP, iSCSI PDU processing, NVMe-oF PDU processing, and the like. The protocol processing 303 processes the reception packet from the network controller driver 301 to extract control information, and information and data on the iSCSI PDU and the NVMe-oF PDU. The reception packet may not contain data. The protocol processing 303 passes the extracted information to the command processing 305. The data may be transferred to the host via the buffer controlled by the buffer control 306 or without going through the buffer.

The protocol processing 303 includes the information acquired from command processing 305 and the data transmitted from the host in the transmission packet to the network. The data may be transferred to the network via the buffer controlled by the buffer control 306 or without going through the buffer. The transmission packet may not contain data.

The command processing 305 executes command processing in cooperation with the host queue control 304, the buffer control 306, and the DMA control 307. The command processing 305 controls the host interface 207 via the host interface driver 302. The command processing 305 exchanges a transmission command or a reception command for network communication with the host system, for example, information for generating PDUs for iSCSI or NVMe-oF, analyzed information, or the PDU itself. The command is exchanged with the host system using the queue interface. The host queue control 304 controls the queue interface.

The command processing 305 generates a descriptor that can be processed by the host from the result of the protocol processing 303, and stores the descriptor in the queue via the host queue control 304. The command processing 305 acquires the descriptor generated by the host system from the queue, and sets each function, such as the protocol processing 303, in the network interface 104 and uses the set function. The descriptor of the queue can be exchanged with the host system by the network interface 104 using the DMA controller 205 by the DMA control 307.

Figure 5:
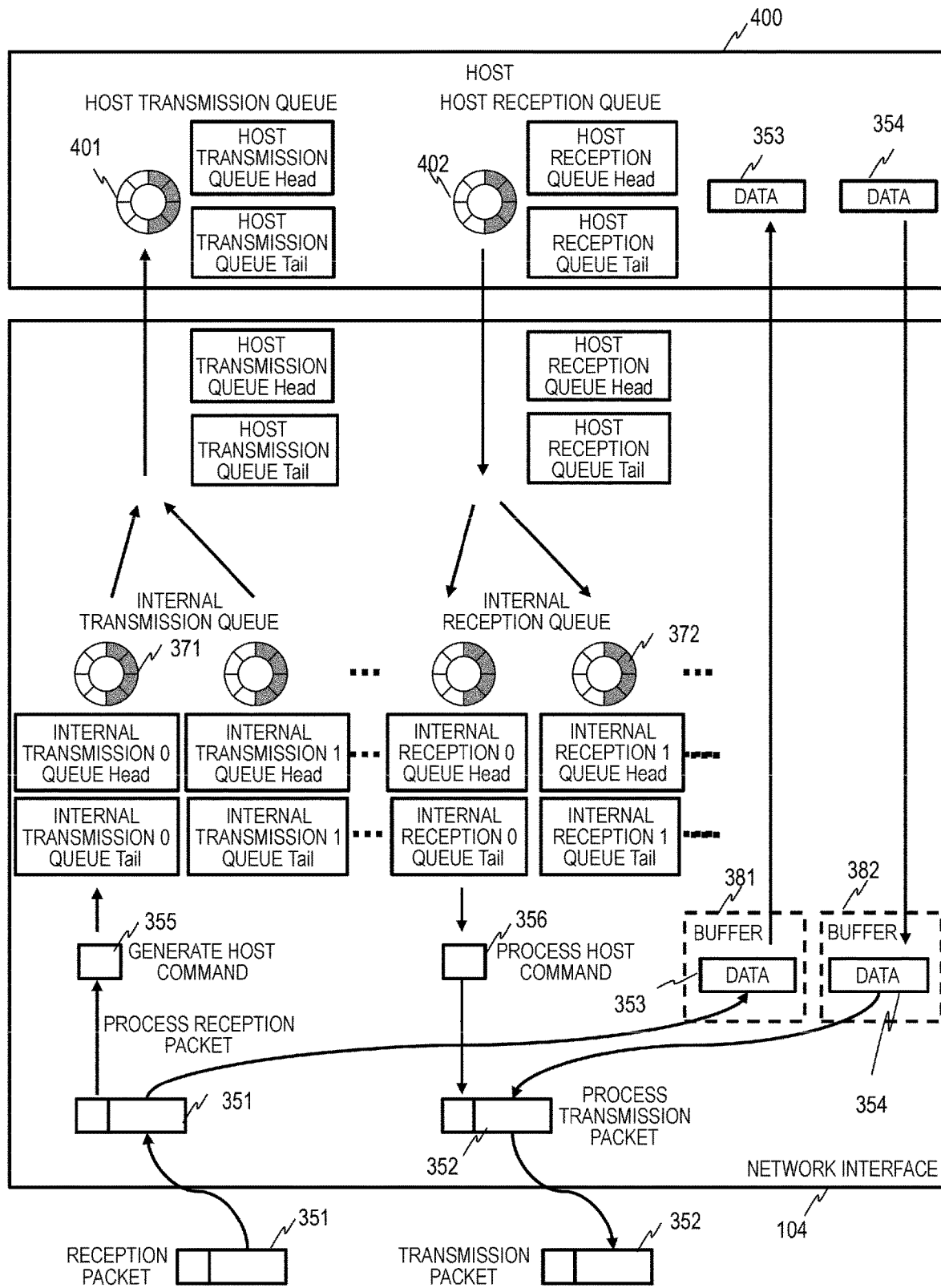
FIG. 5 is a diagram illustrating an outline of processing in which the network interface transmits and receives a command and data to and from a host.

FIG. 5 is a diagram illustrating an outline of processing in which the network interface 104 transmits and receives the command and data to and from the host, for example, the storage controller 102. In the following, the command exchanged with the host is also referred to as a host command.

The network interface 104 receives a packet 351 from the network and allocates processing thereof to one of the cores 241. The core 241 to which the processing is allocated performs protocol processing thereof and extracts information and data. In an example of FIG. 5, the extracted data is stored in a buffer 381. The core 241 generates a host command 355 to be sent to the host from the information extracted from the received packet 351.

The host command is stored in an internal transmission queue 371. The internal transmission queue 371 is prepared for each core 241, and in FIG. 5, one internal transmission queue is indicated by a reference numeral 371 as an example. In the example of FIG. 5, the internal transmission queue 371 is a ring buffer (FIFO), and a new command is stored in a Tail area of the internal transmission queue 371. Head and Tail of each internal transmission queue 371 are managed.

The network interface 104 transfers the host command extracted from the Head of the internal transmission queue 371 to a host transmission queue 401 of a host 400. The host 400 is, for example, the storage controller 102 or the server system 100. The host transmission queue 401 is a ring buffer in the example of FIG. 5. The network interface 104 manages Head and Tail of the host transmission queue 401 together with the host 400.

In the example of FIG. 5, the host commands from a plurality of internal transmission queues 371 are transferred to one host transmission queue 401. In another example, a plurality of host transmission queues 401 may be prepared, and for example, the same number of host transmission queues 401 that respectively correspond to the internal transmission queues 371 may be used.

The host 400 stores the host command to be transferred to the network interface 104 in a host reception queue 402. The host reception queue 402 is a ring buffer. The network interface 104 manages Head and Tail of the host reception queue 402 together with the host 400.

The network interface 104 transfers the command from the host reception queue 402 to an internal reception queue 372 of the network interface 104. The internal reception queue 372 is prepared for each core 241. In FIG. 5, the network interface 104 views the host command transferred from the host, selects one corresponding internal reception queue, and transfers the host command to the selected internal reception queue. In this case, the host command may be viewed by the host queue control 304 or hardware of the DMA. One internal reception queue is indicated by a reference numeral 372 as an example. A plurality of host reception queues 402 may be prepared. For example, the same number of host reception queues 402 that respectively correspond to the internal reception queues 372 may be used so that distribution processing to the internal reception queues 372 becomes unnecessary.

In response to the host command from the host 400, the network interface 104 transfers the data stored in the buffer 381 to the host 400 and also transfers data 354 stored in the memory of the host 400 to a buffer 382. As will be described later, the buffers 381 and 382 are controlled so as to improve the cache hit ratio.

If a host command 356 for transmitting a packet including the data 354 to the network is received, the network interface 104 executes protocol processing of the data 354 by the host command 356 to generate a transmission packet 352. The network interface 104 transmits the transmission packet 352 to the network.

Figure 6A:
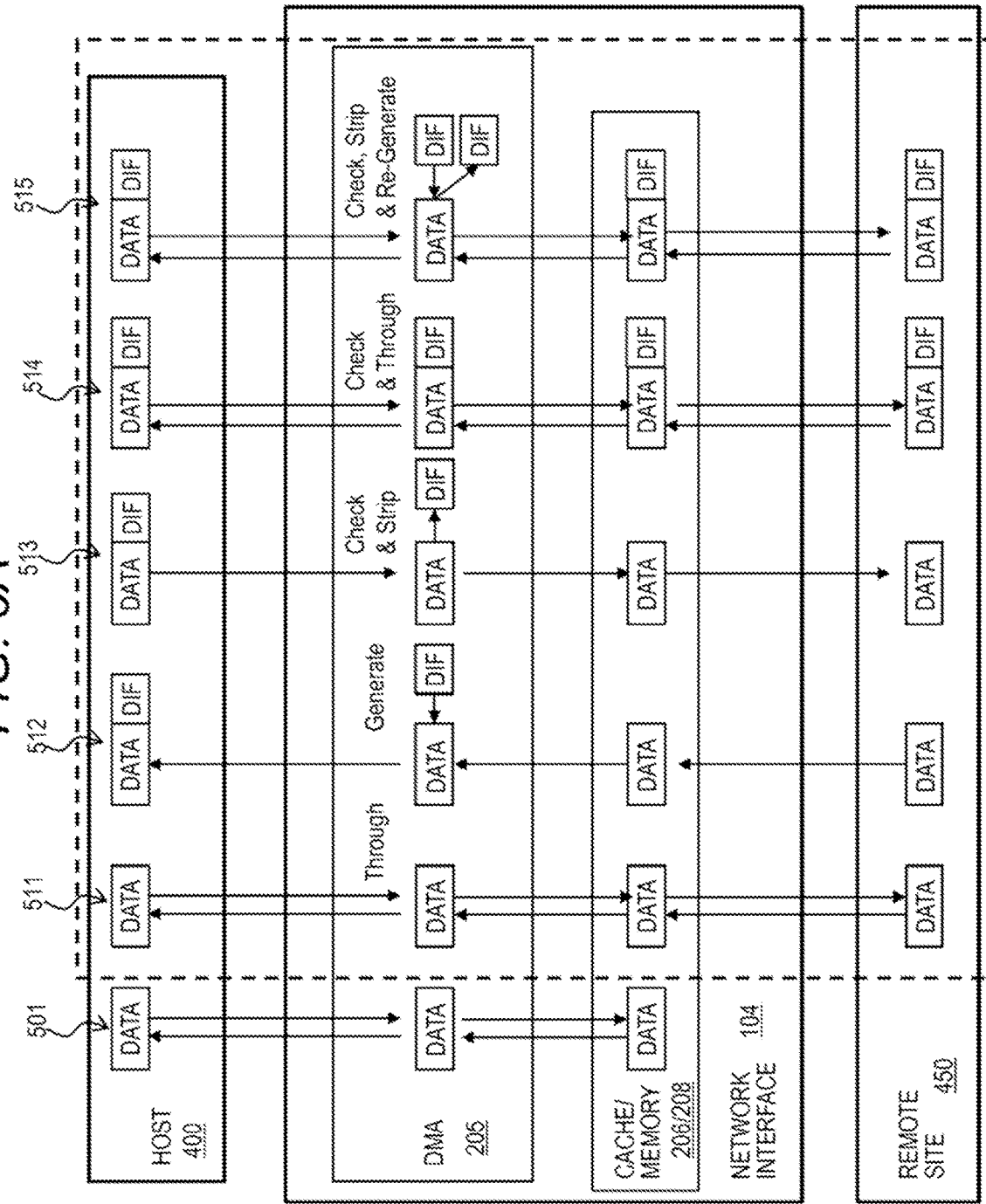
FIG. 6A is a diagram illustrating some aspects of data transfer.

FIGS. 6A and 6B are diagrams illustrating some aspects of data transfer. FIG. 6A illustrates some examples of data transfer using the cache 206/memory 208 of the network interface 104, and FIG. 6B illustrates some examples of data transfer without using the cache 206/memory 208. Data transfer is executed using the DMA controller 205. The network interface 104 may support all data transfers illustrated in FIGS. 6A and 6B, and may support some data transfers, for example, only data transfer in FIG. 6A.

FIG. 6A illustrates data transfer via the cache/memory of the network interface 104. For example, the data transfer via the cache 206/memory 208 of the network interface 104 corresponds to data transfer of iSCSI or NVMe TCP. In FIG. 6A, data transfer 501 is executed between the host 400 and the cache 206/memory 208 of the network interface 104. In the data transfer 501, no error check or guarantee code is attached or removed. The data transfer 501 corresponds to, for example, transfer of update data of a program operating on the network interface 104, transfer of the descriptor to be transferred via the queue, and the like. The data transfer 511 is executed between the host 400 and a remote site 450 via the cache 206/memory 208 of the network interface 104. In the data transfer 511, no error check or guarantee code is attached or removed.

Data transfer 512 is executed from the remote site 450 to the host 400 via the cache 206/memory 208 of the network interface 104. The DMA controller 205 attaches the DIF to data from the remote site 450 and transfers the data to the host 400. Information for generating the DIF is obtained from the host 400.

Data transfer 513 is executed from the host 400 to the remote site 450 via the cache 206/memory 208 of the network interface 104. The DMA controller 205 performs a data check with reference to the DIF attached to the data from the host 400, and removes the DIF from the data. The data from which the DIF is removed is transferred to the remote site 450.

Data transfer 514 is executed between the host 400 and the remote site 450 via the cache 206/memory 208 of the network interface 104. The DIF is attached to the transferred data. The DMA controller 205 executes the error check with reference to the DIF attached to the data.

Data transfer 515 is executed between the host 400 and the remote site 450 via the cache 206/memory 208 of the network interface 104. The DIF is attached to the transferred data. The DMA controller 205 executes the error check with reference to the DIF attached to the data, removes the DIF, and attaches a new DIF thereto.

FIG. 6B illustrates data transfer without going through the cache 206/memory 208 of the network interface 104. For example, a remote direct memory access (RDMA) corresponds to the data transfer.

Data transfer 521 is executed between the host 400 and the remote site 450. In the data transfer 521, no error check or guarantee code is attached or removed. Data transfer 522 is executed from the remote site 450 to the host 400. The DMA controller 205 attaches the DIF to data from the remote site 450 and transfers the data to the host 400.

Data transfer 523 is executed from the host 400 to the remote site 450. The DMA controller 205 performs the data check with reference to the DIF attached to the data from the host 400, and removes the DIF from the data. The data from which the DIF is removed is transferred to the remote site 450.

Data transfer 524 is executed between the host 400 and the remote site 450. The DIF is attached to the transferred data. The DMA controller 205 executes the error check with reference to the DIF attached to the data. Data transfer 525 is executed between the host 400 and the remote site 450. The DIF is attached to the transferred data. The DMA controller 205 executes the error check with reference to the DIF attached to the data, removes the DIF, and attaches a new DIF thereto.

FIG. 7 illustrates a configuration example of a buffer list. The network interface 104 creates and manages buffer groups having different sizes in the memory 208. Each buffer group is composed of a plurality of buffers. The different sizes are set according to the supported transfer data size. For example, buffers having a size of 8 KB, 16 KB, 32 KB, . . . , 256 KB, and the like are secured when the network interface 104 is started up.

Each buffer group is managed by a corresponding buffer list. FIG. 7 illustrates, as an example, a buffer list 700A of a buffer group having a size X, a buffer list 700B of a buffer group having a size Y, and a buffer list 700C of a buffer group having a size Z. The buffer list is managed by the buffer control 306.

Each buffer list contains a plurality of buffer entries 703. In FIG. 7, one buffer entry is indicated by a reference numeral 703, as an example. The buffer entry 703 is represented by a rectangle, and the number inside the rectangle indicates an entry number. For example, the buffer list having a size of 8 KB manages a buffer of 8 KB with a buffer entry number. The buffer entry 703 indicates information about a corresponding buffer.

FIG. 8A illustrates buffer list management information 750 included in each buffer list. The buffer list management information 750 indicates a buffer entry head address 751 and a buffer active number 752. The buffer entry head address 751 indicates an address of a head entry in the buffer list. The buffer active number 752 indicates the number of buffer entries currently in use.

FIG. 8B illustrates information held by the buffer entry 703. The buffer entry 703 indicates a buffer entry address 761, a buffer address 762, and a next buffer entry address 763. The buffer entry address 761 indicates an address of the buffer entry. The buffer address 762 indicates an address in the memory 208 of a buffer managed by the buffer entry 703. The next buffer entry address 763 indicates an address of a next buffer entry of the buffer entry 703.

In the buffer entry 703, whether the buffer is active or available may be managed in a field (not illustrated). The buffer entry head address 751 indicates the head entry of the buffer entries of available buffers. The buffer entries of the available buffers are ordered and arranged according to the next buffer entry address 763. In this way, in the buffer list, the buffer entry is selected from the head buffer entry to store new data. In this way, allocation order of the buffer entries for the available buffers is managed.

When the head buffer entry is selected, the buffer entry head address 751 is updated. Therefore, the entries of the buffers being used are excluded from the list of entries of the available buffers. As will be described later, the buffer entry released after being used in the data transfer is returned to a predetermined position in a list of available buffer entries, which is a head position in an example described below.

By the buffer lists of the plurality of buffer sizes described above, the amount of memory to be used is reduced when the transfer request with a large number of short data lengths comes by using different buffers for the short data length and the long data length while reducing a buffer securing load during I/O, and a load of selecting the list is reduced by reducing the number of buffers used when the transfer request with the long data length comes.

FIG. 9 illustrates a configuration example of a buffer management table 770. The buffer management table 770 indicates information for managing the buffer and is generated by the storage controller 102. The buffer management table 770 enables the buffer group to be dynamically changed. Specifically, the buffer management table 770 indicates a buffer list 771, a buffer size 772, the number of buffers 773, a maximum active number 774, and a control type 775.

The buffer list 771 indicates an identifier for the buffer list. The buffer size 772 indicates a buffer size of the buffer group managed by the buffer list. The number of buffers 773 indicates the number of buffers managed by the buffer list, that is, the buffer entry number. The number of buffers 773 indicates the number of buffers secured at initialization. The maximum active number 774 indicates the maximum number of buffers that can be used at the same time in the buffer group managed by the buffer list. By changing the maximum active number, the maximum number of buffers that can be used at the same time is dynamically controlled. The control type 775 indicates a control type of the buffer. A buffer control method is switched according to the control type. For example, it is possible to switch whether a method of calculating an allowable active number of the buffers is performed for each buffer list or is performed based on an active number of the buffers of all buffer lists. When transferring is performed based on the buffer size of the buffer list, it is possible to switch between a method of using a plurality of buffers and a method of securing a new area.

Figure 10:
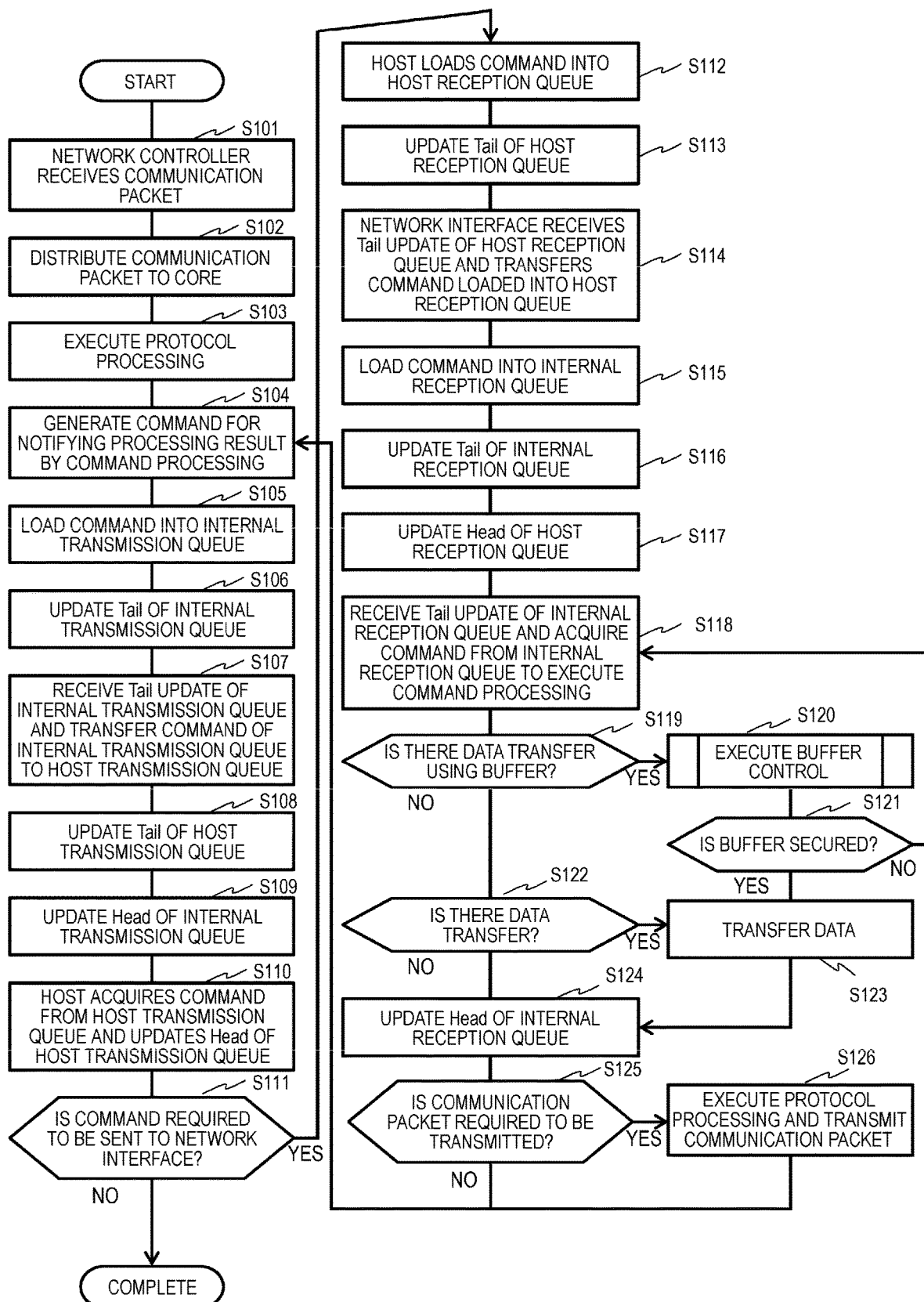
FIG. 10 illustrates an example of a processing flow of a network interface of target.

FIG. 10 illustrates an example of a processing flow of the network interface 104 of target. The network interface 104 executes processing for a communication packet from the network to the host of the network interface 104. For example, the host is the storage controller 102 of target, and the communication packet is transferred from the server system 100 of initiator via the network 106.

The network controller 203 receives the communication packet from the network (S101). The network controller 203 distributes protocol processing of the received communication packet to the core of the processor 204 (S102).

The core to which the protocol processing of the communication packet is allocated executes the protocol processing 303 (S103). The protocol processing 303 extracts information from the communication packet and passes the information to the command processing 305.

The command processing 305 generates a host command for notifying the host of the communication protocol processing result, according to the information extracted from the communication packet (S104). The notification of the processing result is, for example, notifying the storage controller 102 that a read request and a write request are received from the network. Furthermore, the command processing 305 loads the generated host command into the internal transmission queue 371 in the network interface 104 (S105). In response to loading the host command, the command processing 305 updates Tail of the internal transmission queue 371 (S106).

The host queue control 304 receives Tail update of the internal transmission queue 371 of the core in charge, and transfers the host command of the internal transmission queue 371 to the host transmission queue using the DMA controller 205 via the DMA control 307 (S107). In response to transferring the host command, the host queue control 304 updates Tail of the host transmission queue 401 (S108). As for information about the Tail and Head of the host transmission queue 401, the network interface 104 and the host may refer to the same information, or information held by each of the network interface 104 and the host may be transferred. Furthermore, the host queue control 304 updates Head of the internal transmission queue (S109).

The host acquires the host command from the host transmission queue 401 and updates the Head of the host transmission queue 401 (S110). The network interface 104 may receive and update the Head of the host transmission queue 401 in accordance with the update on the host side, or may receive a notification from the host at a different timing. The host refers to the acquired host command and determines whether the command is required to be sent to the network interface 104 (S111).

When it is determined that the host is required to send the host command to the network interface 104 (YES in S111), the host loads the host command into the host reception queue 402 (S112) and updates Tail of the host reception queue 402 (S113). In response to updating the information about the host reception queue 402 held by the host, the network interface 104 also updates the information about the host reception queue 402 held by the network interface 104. As for the update, the host and the network interface 104 may refer to common information and transfer the update information between the host and the network interface 104.

Upon receiving the Tail update of the host reception queue 402, the host queue control 304 of any core transfers the host command loaded in the host reception queue 402 to the network interface 104 by using the DMA controller 205 by the DMA control 307 (S114). For example, each core may periodically hold locks to see if there are updates of the host reception queue, and when there are updates, each core may perform transfer processing, a core dedicated to checking for updates of the host reception queue and transferring may be provided, and each core may create a plurality of host reception queues, and may perform transfer processing when there is an update of the reception queue of the core in charge. The host queue control 304 loads the host command from the host into the internal reception queue 372 (S115). For example, the host queue control 304 may check the host command to determine which internal reception queue 372 to load the host command into, or the host command may be loaded into the corresponding internal reception queue 372 when there are a plurality of host reception queues.

In response to loading the host command into the internal reception queue 372, the host queue control 304 updates the Tail of the internal reception queue 372 (S116) and further updates the Head of the host reception queue 402 (S117). A method of updating the Head of the host reception queue 402 is as described for the update of the Tail of the host reception queue 402.

The command processing 305 acquires the host command from the internal reception queue 372 and executes processing (S118). When data transfer using the buffer is required (YES in S119), a buffer control step S120 is executed. Details of the buffer control step S120 will be described later. The data transfer is data transfer from the network to the host or data transfer from the host to the network.

When it is failed to secure the buffer (NO in S121), the flow returns to step S118. When the buffer is secured (YES in S121), the command processing 305 transfers data from the host to the buffer using the DMA controller 205 by the DMA control 307, or stores the data from the network controller 203 in the buffer and transfers the data from the buffer to the host using the DMA controller 205 (S123). In response to transferring the data, the host queue control 304 updates the Head of the internal reception queue 372 (S124).

Returning to step S119, when data transfer using the buffer is not required (NO in S119), the command processing 305 determines whether or not there is data transfer (S122). When data transfer without using the buffer is required (YES in S122), the DMA controller 205 transfers data between the network controller 203 and the host without going through the buffer (S123). When data transfer without using the buffer is not required (NO in S122), the next processing is performed without transferring data. The host queue control 304 updates the Head of the internal reception queue 372 (S124).

Next, the command processing 305 determines whether a communication packet is required to be transmitted to the network (S125). When the transmission of the communication packet is not required (NO in S125), the flow returns to step S104. When the transmission of the communication packet is required (YES in S125), the command processing 305 requests the protocol processing 303, the protocol processing 303 executes the protocol processing to generate the communication packet, and the network controller 203 transmits the communication packet to the network (S126).

Figure 11:
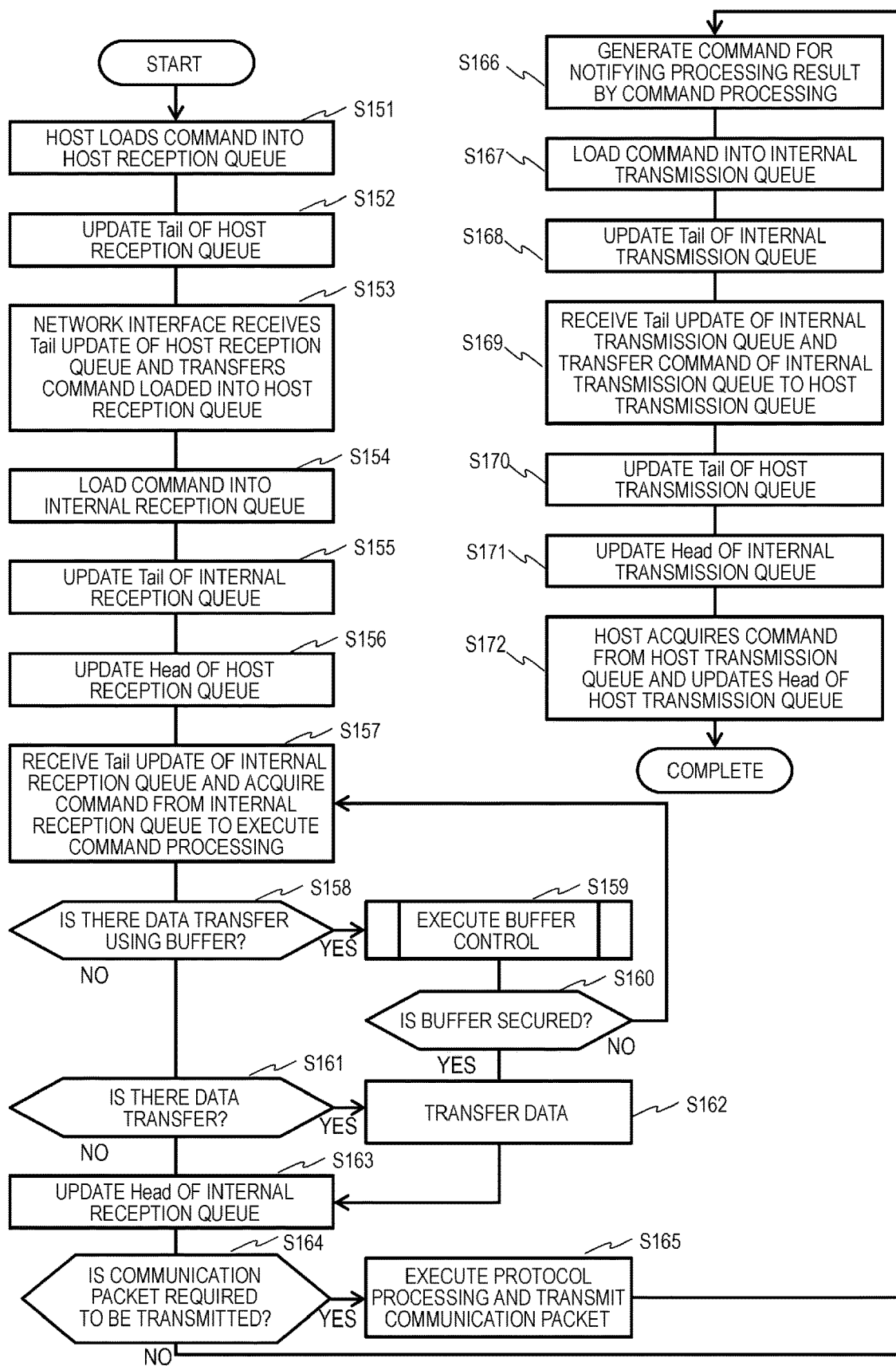
FIG. 11 illustrates an example of a processing flow of a network interface of initiator.

FIG. 11 illustrates an example of a processing flow of the network interface 104 of initiator. For example, the server system 100 that accesses the storage controller 102 and the network interface 104 implemented by the storage controller 102 of initiator in the inter-storage communication operate according to FIG. 11.

The host loads the host command into the host reception queue 402 (S151) and updates the Tail of the host reception queue 402 (S152). In response to updating the information about the host reception queue 402 held by the host, the network interface 104 also updates the information about the host reception queue 402 held by the network interface 104. As for the update, the host and the network interface 104 may refer to common information and transfer the update information between the host and the network interface 104.

Upon receiving the Tail update of the host reception queue 402, the command processing 305 of any core transfers the host command loaded in the host reception queue 402 to the network interface 104 by using the DMA controller 205 by the DMA control 307 (S153). For example, each core may periodically hold locks to see if there are updates of the host reception queue, and when there are updates, each core may perform transfer processing, a core dedicated to checking for updates of the host reception queue and transferring may be provided, and each core may create a plurality of host reception queues, and may perform transfer processing when there is an update of the reception queue of the core in charge.

The host queue control 304 loads the host command from the host into the internal reception queue 372 (S154). For example, the host queue control 304 may select the internal reception queue 372 into which the host command is loaded in a round robin manner if a session is new, the host queue control 304 may check the host command to determine which internal reception queue 372 to load the host command into, or when there are a plurality of host reception queues, the host command may be loaded into the corresponding internal reception queue 372.

In response to loading the host command into the internal reception queue 372, the host queue control 304 updates the Tail of the internal reception queue 372 (S155) and further updates the Head of the host reception queue 402 (S156). A method of updating the Head of the host reception queue 402 is as described for the update of the Tail of the host reception queue 402.

The command processing 305 acquires the host command from the internal reception queue 372 and executes processing (S157). When data transfer using the buffer is required (YES in S158), a buffer control step S159 is executed. Details of the buffer control step S159 will be described later. The data transfer is data transfer from the network to the host or data transfer from the host to the network.

When it is failed to secure the buffer (NO in S160), the flow returns to step S157. When the buffer can be secured (YES in S160), the command processing 305 transfers data to the buffer using the DMA controller 205 by the DMA control 307 (S162). In response to transferring the data, the host queue control 304 updates the Head of the internal reception queue 372 (S163).

Returning to step S158, when data transfer using the buffer is not required (NO in S158), the command processing 305 determines whether or not there is data transfer (S161). When data transfer without using the buffer is required (YES in S161), the DMA controller 205 transfers data between the network controller 203 and the host without going through the buffer (S162). When data transfer without using the buffer is not required (NO in S161), the host queue control 304 updates the Head of the internal reception queue 372 (S163).

Next, the command processing 305 determines whether the communication packet is required to be transmitted to the network (S164). When the transmission of the communication packet is not required (NO in S164), the flow proceeds to step S166. When the transmission of the communication packet is required (YES in S164), the command processing 305 requests the protocol processing 303, the protocol processing 303 executes the protocol processing to generate the communication packet, and the network controller 203 transmits the communication packet to the network (S165).

Next, the command processing 305 generates a host command for notifying the host of the processing result of the host command from the host (S166). The notification of the processing result is, for example, notifying the host that the communication packet is transmitted to the network. Furthermore, the command processing 305 loads the generated host command into the internal transmission queue 371 in the network interface 104 (S167). In response to loading the host command, the command processing 305 updates the Tail of the internal transmission queue 371 (S168).

The host queue control 304 receives the Tail update of the internal transmission queue 371 of the core in charge, and transfers the host command of the internal transmission queue 371 to the host transmission queue using the DMA controller 205 via the DMA control 307 (S169). In response to transferring the host command, the host queue control 304 updates the Tail of the host transmission queue 401 (S170). As for information about the Tail and Head of the host transmission queue 401, the network interface 104 and the host may refer to the same information, or information held by each of the network interface 104 and the host may be transferred. Furthermore, the host queue control 304 updates the Head of the internal transmission queue (S171).

The host acquires the host command from the host transmission queue 401 and updates the Head of the host transmission queue (S172).

Figure 12:
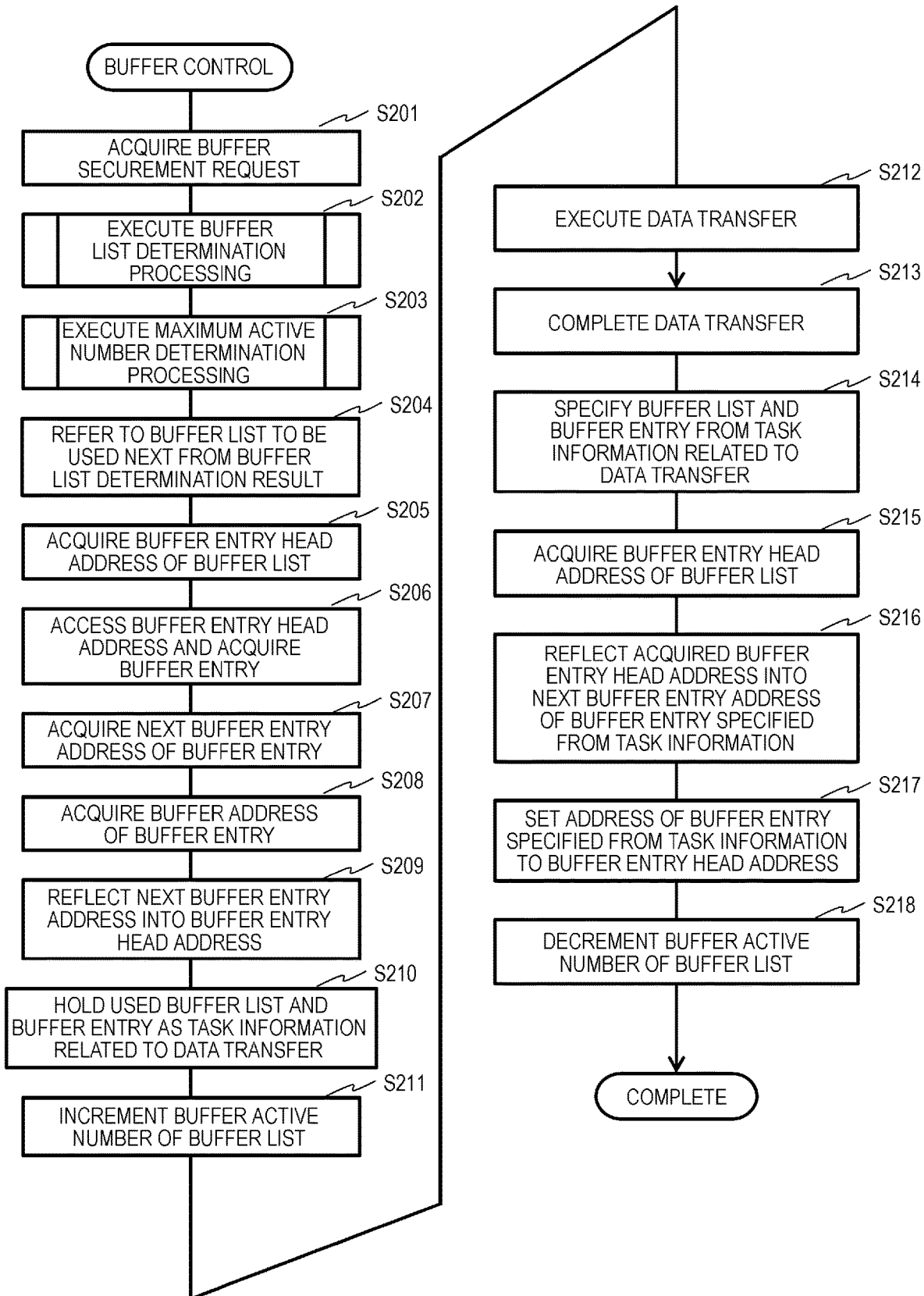
FIG. 12 illustrates a flowchart of an example of buffer control processing.

Hereinafter, the details of buffer control processing including the buffer control steps S120 and S159 in FIGS. 10 and 11 will be described. FIG. 12 illustrates a flowchart of an example of buffer control processing. First, the buffer control 306 acquires a buffer securement request from, for example, the command processing 305 (S201).

The buffer control 306 executes a buffer list determination step (S202). In the buffer list determination step, it is determined which buffer group is used in the buffer groups having different sizes. The details of the buffer list determination step will be described later.

Furthermore, the buffer control 306 refers to a buffer list of the selected buffer group and the buffer management table 770, and executes a maximum active number determination step (S203). The details of the maximum active number determination step will be described later. In the maximum active number determination step, execution or standby of the current buffer control is determined. When it is determined, in the maximum active number determination step S203, that the buffer control is to be executed, the flow proceeds to step S204.

The buffer control 306 refers to the buffer list determined in the buffer list determination step S202 (S204), and acquires the buffer entry head address 751 of the buffer list (S205). The buffer control 306 accesses the acquired buffer entry head address and acquires the buffer entry 703 (S206).

The buffer control 306 acquires the next buffer entry address 763 from the acquired buffer entry 703 (S207), and further acquires the buffer address 762 therefrom (S208).

Next, the buffer control 306 reflects the next buffer entry address 763 into the buffer entry head address 751 of the buffer list management information 750 (S209). The buffer control 306 holds the used buffer list and buffer entry as task information related to data transfer (S210). One or more entries in each of one or more buffer lists may be held as information on a task being executed (before completion). The buffer control 306 increments the buffer active number 752 of the buffer list management information 750 (S211).

When data transfer using the buffer is executed (S212) and the data transfer is completed (S213), the buffer control 306 specifies the buffer list and the buffer entry to which the data transfer corresponds, from the task information related to the data transfer held in step 210. The buffer control 306 acquires the buffer entry head address 751 of the buffer list (S215).

The buffer control 306 reflects the acquired buffer entry head address 751 into the next buffer entry address 763 of the buffer entry specified from the task information (S216). The buffer control 306 sets the address 761 of the buffer entry specified from the task information to the buffer entry head address 751 (S217). Finally, the buffer control 306 decrements the buffer active number 752 of the buffer list.

According to the operation described above, the buffer entry, for which the data transfer is completed immediately before, is returned to the head of the buffer list. In the next data transfer, the buffer entries are used in order from the head buffer entry in the buffer list. In a cache area, data on an associated buffer area is stored. Therefore, the same buffer is used, and if the data on that buffer is cached, a cache hit occurs. With this configuration, the number of times of memory accesses can be reduced. The released buffer may be returned to a position different from the head of the buffer list. For example, the released buffer is returned before a preset order. In the above example, the head corresponds to the preset order.

Figure 13:
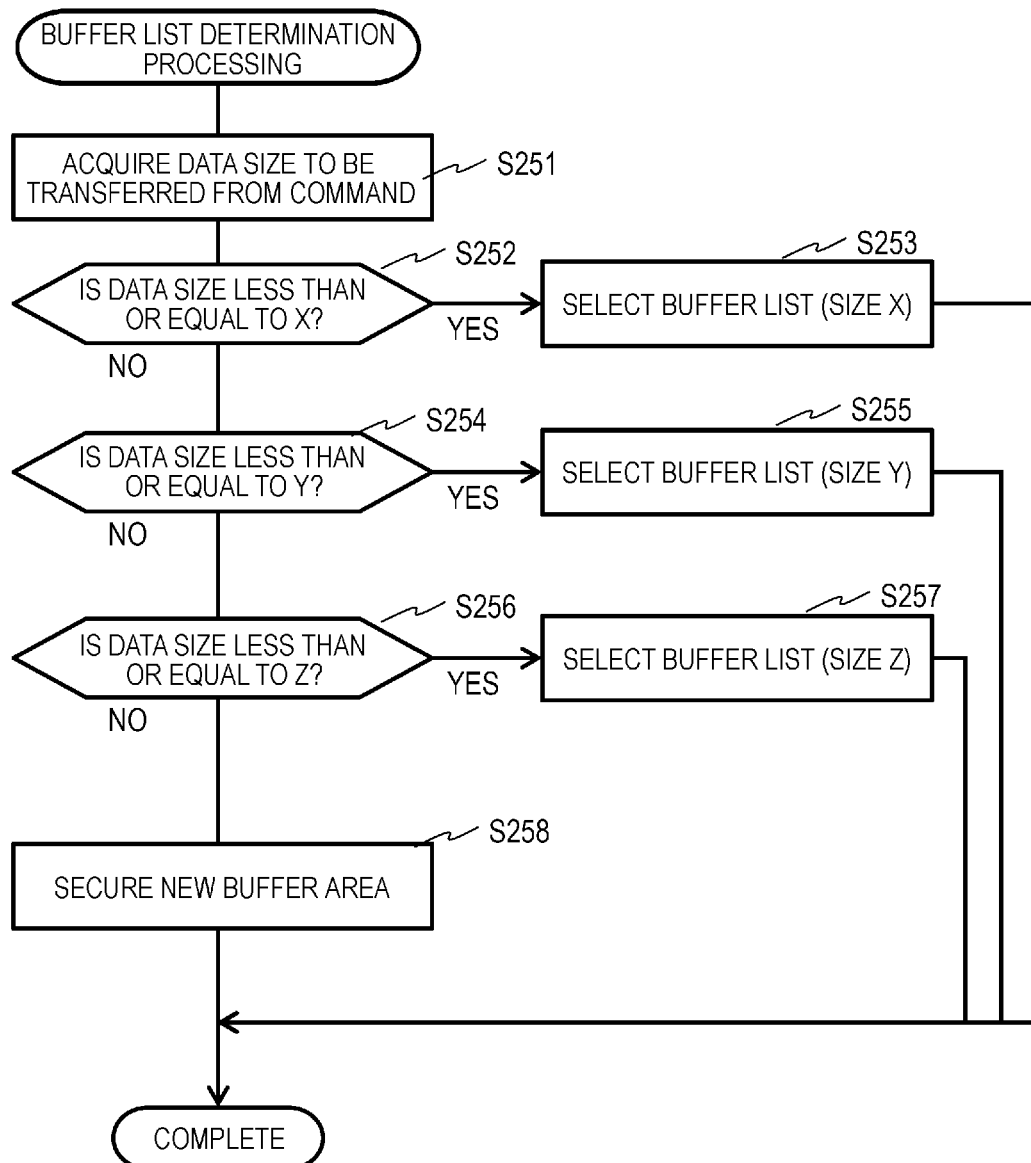
FIG. 13 illustrates a flowchart of an example of buffer list determination processing.

Next, processing of the buffer list determination step S202 will be described. FIG. 13 illustrates a flowchart of an example of buffer list determination processing. In this example, it is assumed that three types of buffers having different sizes of X, Y, and Z, are managed by the corresponding buffer lists. A magnitude relation between the buffer sizes is as follows, X<Y<Z. For example, X=8 KB, Y=32 KB, and Z=256 KB may be used. The number of types of buffer sizes is any number, and each buffer size is also any size.

The buffer control 306 acquires a data size to be transferred from the host command (S251). When the data size is equal to or less than X (YES in S252), the buffer control 306 selects the buffer list of size X (S253). When the data size is greater than X and equal to or less than Y (NO in S252 and YES in S254), the buffer control 306 selects the buffer list of size Y (S255).

When the data size is greater than Y and equal to or less than Z (NO in S254 and YES in S256), the buffer control 306 selects the buffer list of size Z (S253). When the data size is greater than Z (NO in S256), the buffer control 306 secures a buffer having a longer size greater than Z in the memory 208 (S258).

As described above, by sequentially determining from the buffer list of a smaller size, the buffer having the smallest buffer size among the buffer sizes greater than or equal to the transfer data size is selected for storing transfer data. With this configuration, the buffer area can be used efficiently. The reason why the buffer area for long size data is secured on the spot is that if the data size is long, the data transfer time by the DMA controller 205 becomes long and a processor load during data transfer is low, and thus the processor load is low even if the buffer area is secured each time. This is because long-size data easily overflows from the cache and memory access occurs, and thus list management is not required.

Next, an example in which the buffer list determination is performed by a method different from the buffer list determination step S202 will be described. In the example described with reference to FIGS. 12 and 13, transfer data is stored in one buffer. In the example described below, large transfer data is distributed and stored in a plurality of buffers. With this configuration, transfer data greater than the buffer size managed by the buffer list can be stored in the buffer managed by the buffer list.

Figure 14:
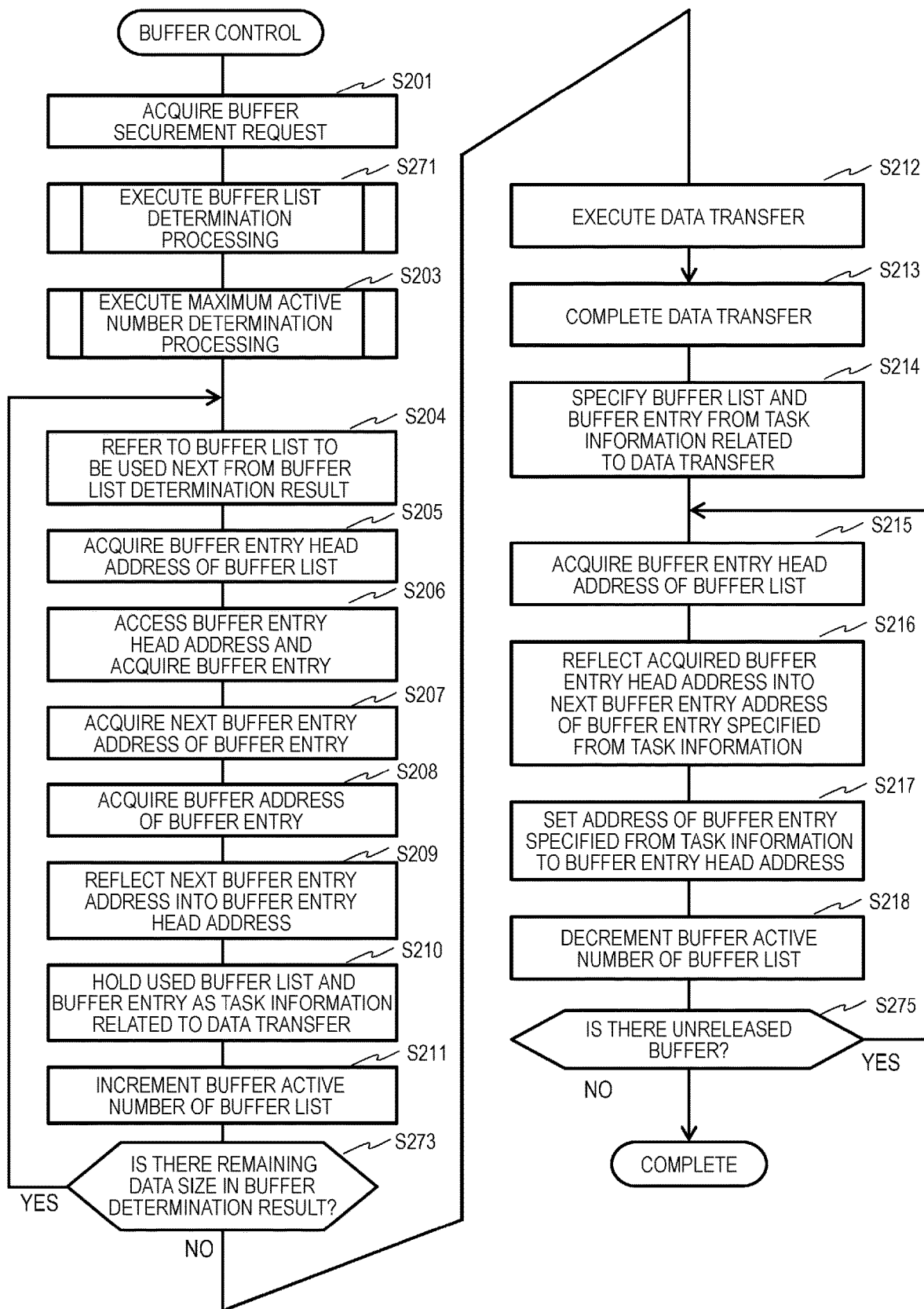
FIG. 14 is a flowchart of an example of the buffer control processing.

FIG. 14 is a flowchart of an example of the buffer control processing. The differences from the flowchart illustrated in FIG. 12 will be mainly described. The buffer control 306 executes a buffer list determination step S271. The buffer list determination step S271 is different from the buffer list determination step S202 of FIG. 12. The buffer control 306 executes step S273 after step S211 and executes step S275 after step S218.

Figure 15:
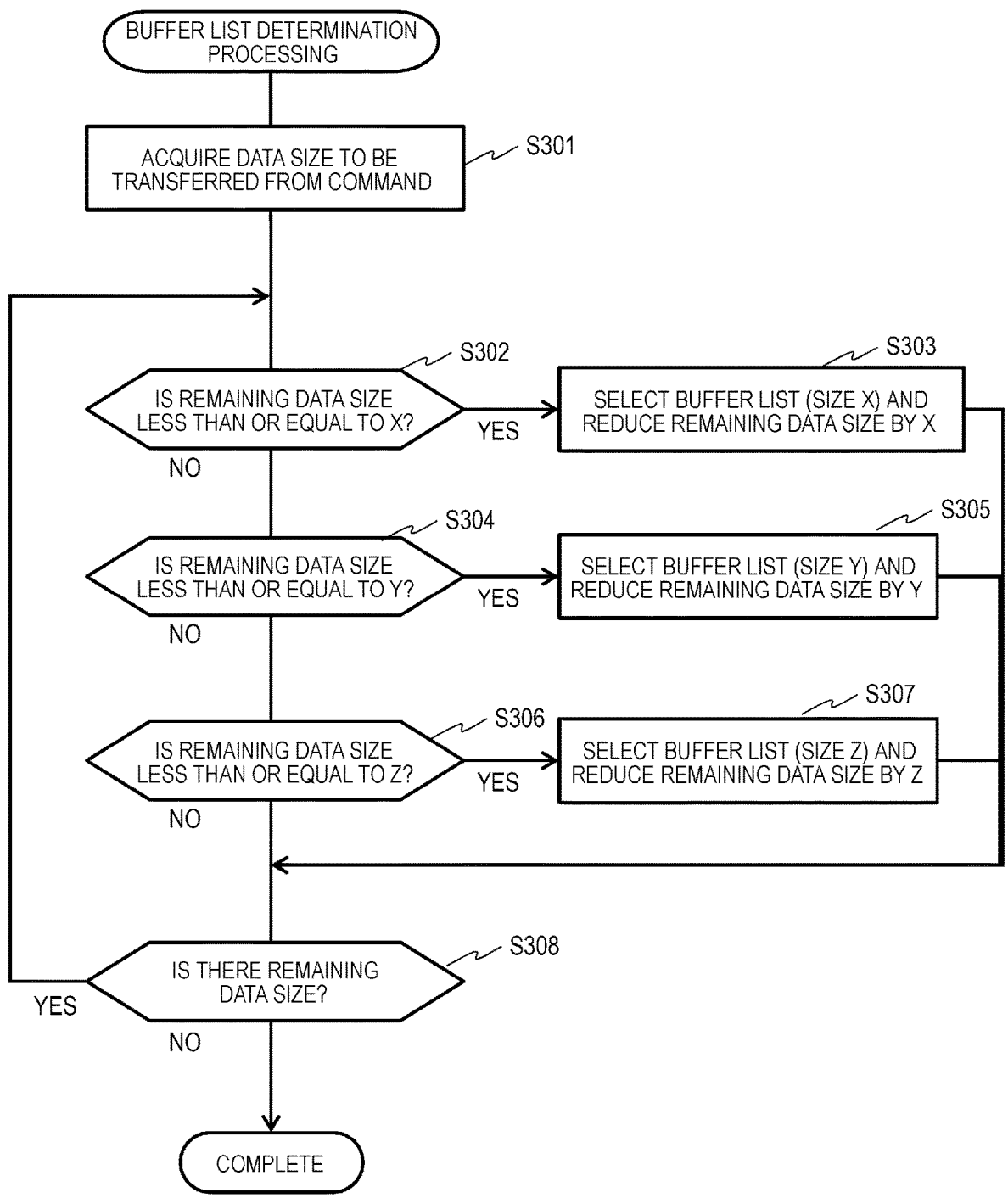
FIG. 15 illustrates a flowchart of a processing example in a buffer list determination step.

First, the buffer list determination step S271 will be described. FIG. 15 illustrates a flowchart of a processing example in the buffer list determination step S271. The buffer control 306 acquires a remaining data size of data to be transferred from the host command (S301). When the remaining data size is equal to or less than X (YES in S302), the buffer control 306 selects a buffer list of size X and further, reduces the remaining data size by X (S303).

When the remaining data size is greater than X and equal to or less than Y (NO in S302 and YES in S304), the buffer control 306 selects a buffer list of size Y, and further reduces the remaining data size by Y (S305). When the remaining data size is greater than Y and equal to or less than Z (NO in S304 and YES in S306), the buffer control 306 selects a buffer list of size Z and reduces the remaining data size by Z (S307).

When the remaining data size is greater than Z (NO in S306), or after any one of steps S303, S306, or S307 is executed, the buffer control 306 determines whether there is the remaining data size (S308). When a total size of the allocated buffer is greater than or equal to the transfer data size, the remaining data size is 0. When it is determined that there is the remaining data size (YES in S308), the flow returns to step S302. When it is determined that there is no remaining data size (NO in S308), the buffer list determination processing ends.

As described with reference to FIG. 15, large-sized transfer data is divided into a plurality of pieces of partial data, and the buffer having a corresponding size is allocated to each partial data. Returning to FIG. 14, the buffer control 306 executes steps S204 to S211 for each partial data. In step S273, it is determined whether steps S204 to S211 are executed for all the partial data. After the data transfer is completed, the buffer control 306 executes steps S215 to S218 for each partial data. In step S275, it is determined whether steps S215 to S218 are executed for all the partial data.

Figure 16:
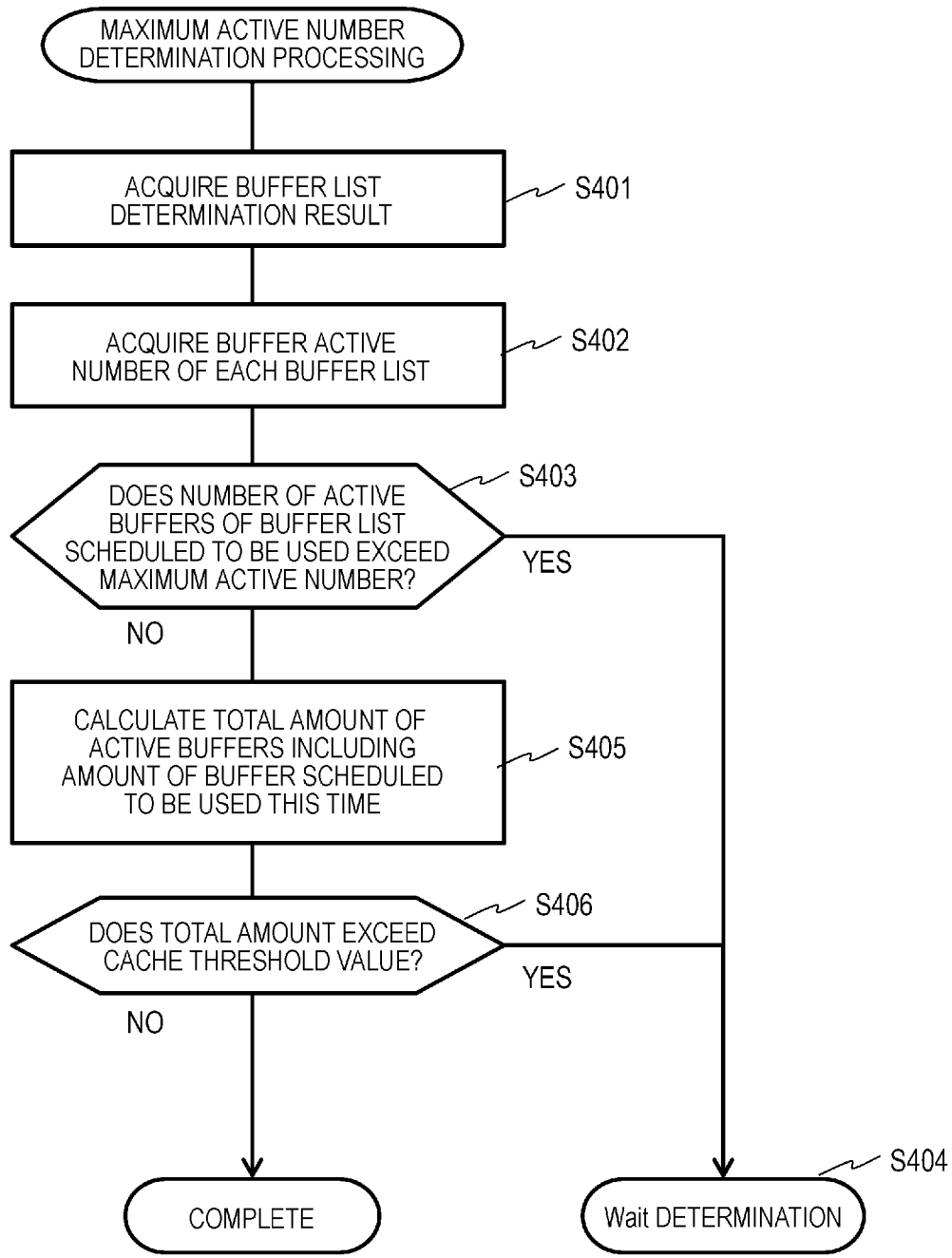
FIG. 16 illustrates a flowchart of an example of a maximum active number determination processing.

Hereinafter, processing of the maximum active number determination step S203 of FIGS. 12 and 14 will be described. FIG. 16 illustrates a flowchart of an example of the maximum active number determination processing. In the following, it is assumed that an individual cache threshold value and an individual buffer list group are allocated to each core 241.

The buffer control 306 acquires a buffer list determination result (S401). Next, the buffer control 306 acquires the buffer active number 752 from the buffer list management information 750 of each buffer list (S402).

The buffer control 306 calculates the buffer active number 752 and a total number of buffers scheduled to be used (the number of scheduled active buffers) for each buffer list scheduled to be used indicated by the buffer list determination result, and compares the total number with the maximum active number 774 (S403). When the number of scheduled active buffers in any of the buffer lists exceeds the maximum active number 774 (YES in S403), the buffer control 306 determines that the processing is interrupted and waits for a predetermined time (S404). After this, the flow returns to the buffer list determination steps S202 and S271.

When the number of scheduled active buffers in each buffer list is equal to or less than the corresponding maximum active number 774 (NO in S403), the buffer control 306 calculates a total amount of active buffers including an amount of buffer scheduled to be used this time (S405). Specifically, the buffer control 306 calculates a sum of products ((X size×X active number)+(Y size×Y active number)+(Z size×Z active number)) of the size of the buffer list allocated to the core and buffer active number. The buffer control 306 adds the amount of buffer scheduled to be used this time to the sum of products.

Next, the buffer control 306 compares the total amount of active buffers with a cache threshold value allocated to the core (S406). The cache threshold value is a value equal to or less than a cache capacity allocated to the core. When the total amount of active buffers is equal to or less than the cache threshold value (NO in S406), the maximum active number determination processing ends. When the total amount of active buffers is greater than the cache threshold value (YES in S406), the buffer control 306 determines that the processing is interrupted and waits (S404). After that, the buffer control processing is started again after a predetermined time.

As described above, the network interface 104 controls the command processing that can be started from the difference between the cache capacity and the total active buffer use amount. The number of data transfers to be processed at the same time is limited and the number of buffers used is limited so that a cache overflow does not occur as much as possible. With this configuration, performance deterioration due to band congestion of the memory can be prevented by reducing the number of memory accesses by making the cache hit to occur.

In the above example, the buffer list group and the cache threshold value are individually allocated to each core. An individual cache area may be allocated to each core. One cache area may be shared by a plurality of cores, that is, may be used by the plurality of cores.

In another example, the cache area and all buffer lists are shared by all cores. Furthermore, the cache threshold value may be defined for the shared cache area, that is, the cache threshold value may be shared by the cores. In this configuration example, each core may execute the maximum active number determination processing as described with reference to FIG. 16.

In another example, the cache area may be shared by all cores, the cache threshold value may be defined for the shared cache area, and the buffer list group may be allocated to each core. In this configuration example, each core calculates the total amount of active buffers by referring to the information about the buffer list group allocated to other cores in addition to the buffer list group allocated to its own core.

In another configuration example, the cache threshold value may be set individually for each core, and the buffer list group may be shared by the cores. Each core may hold information about the buffer used as task information and compare the total amount of buffers used with the individual cache thresholds.

In another configuration example, the cores may be grouped into a plurality of core groups, and the cache area may be allocated to each core group. For example, the cache threshold value and the buffer list group are allocated to each core group. Each core may execute the maximum active number determination processing as described with reference to FIG. 16 by using the buffer list group and the cache threshold value of the same core group.

In the example described with reference to FIG. 16, it is determined whether or not to permit securement of the buffer based on the maximum active number which is set for each buffer list (S403). In another example, step S403 may be omitted, and it may be determined whether or not to permit securement of the buffer based only on an amount of the cache used.

As described above, the cores may be divided into a plurality of groups, and different cache areas may be allocated to the respective groups. In this configuration, the network interface 104 may execute performance balancing among a plurality of network ports. With this configuration, the performance of the network interface 104 can be improved.

For example, it is assumed that eight cores 0 to 7 exist, and two cores form each group. Here, it is assumed that core 0 and core 1 form one group, core 2 and core 3 form one group, core 4 and core 5 form one group, and core 6 and core 7 form one group. It is assumed that the cache area and the buffer list group are allocated to each group. It is assumed that the network interface 104 includes two ports of port 0 and port 1.

The network interface 104 allocates the cores of each group to different ports. For example, core 0, core 2, core 4, and core 6 are allocated to port 0, and core 1, core 3, core 5, and core 7 are allocated to port 1. For example, in each group, a cache threshold value of half the cache capacity is allocated to each core. With this configuration, an amount of cache used by each of port 0 and port 1 can be equalized and the performance can be balanced. The cache threshold values of the cores in each group may not be the same.

Alternatively, the network interface 104 may allocate the cores of the group to the same port. For example, core 0, core 1, core 2, and core 3 are allocated to port 0, and core 4, core 5, core 6, and core 7 are allocated to port 1. In each group, the cache threshold value may be set for each port, or the cache threshold value which is set for the cache area may be used for both of the two cores.

Figure 17:
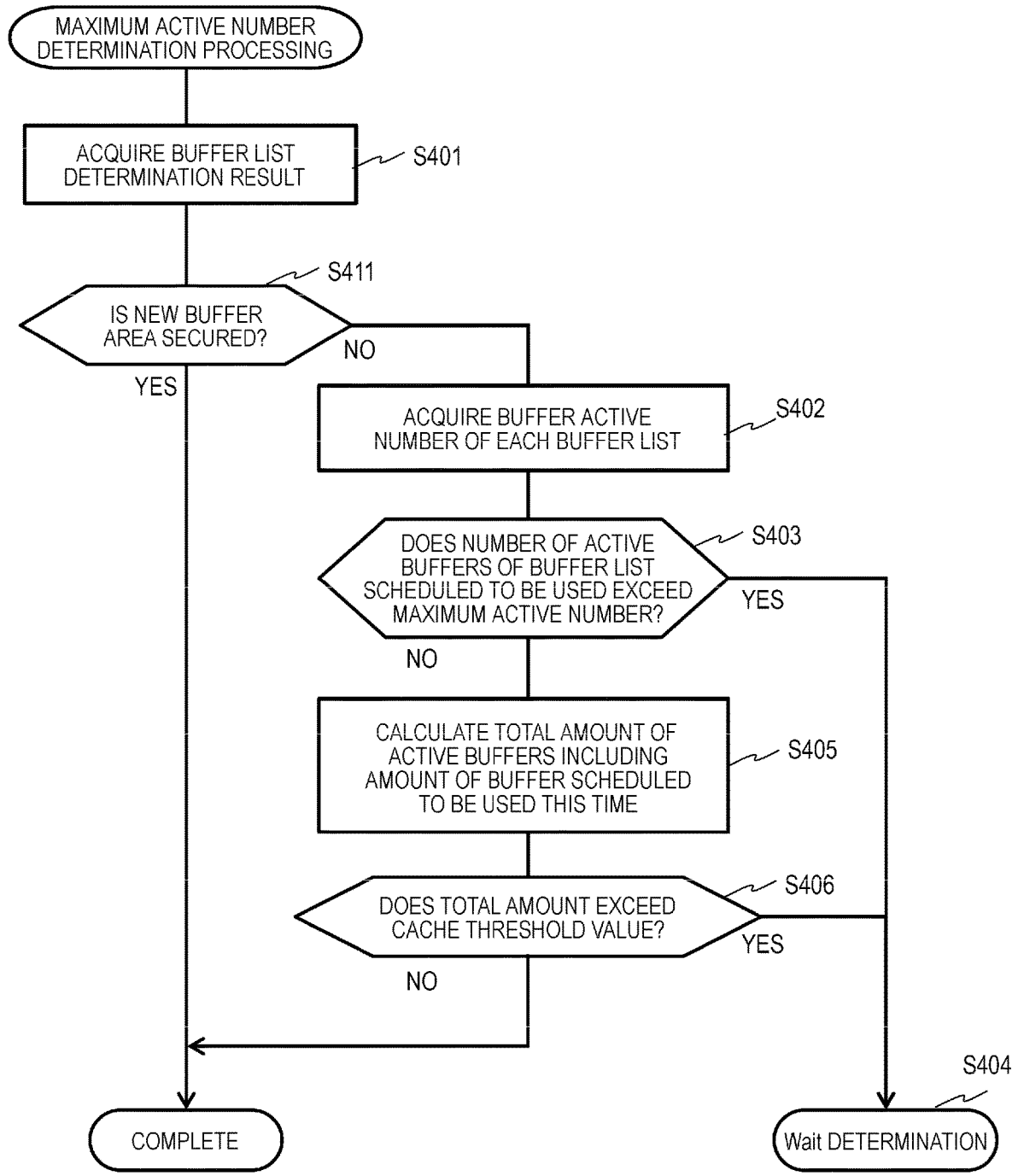
FIG. 17 illustrates a flowchart of another example of the maximum active number determination processing.

Hereinafter, another example of the maximum active number determination processing will be described. FIG. 17 illustrates a flowchart of another example of the maximum active number determination processing. Hereinafter, the differences from the processing example illustrated in FIG. 16 will be mainly described. This example of the maximum active number determination processing is executed together with the buffer list determination processing described with reference to FIG. 13. In this processing example, when a new buffer area is secured (step S258 in FIG. 13), data transfer is performed without making a determination on a cache remaining amount. When the transfer data size is large, the cache overflow is likely to occur. In this example, the maximum active number determination processing can be made efficient.

With reference to FIG. 17, after acquiring the buffer list determination result (S401), the buffer control 306 determines whether the new buffer area is secured (S411). When the new buffer area is not secured (NO in S411), the buffer control 306 executes step S402 and subsequent steps. These steps are as described with reference to FIG. 16. When the new buffer area is secured (YES in S411), the maximum active number determination processing is completed.

Figure 18:
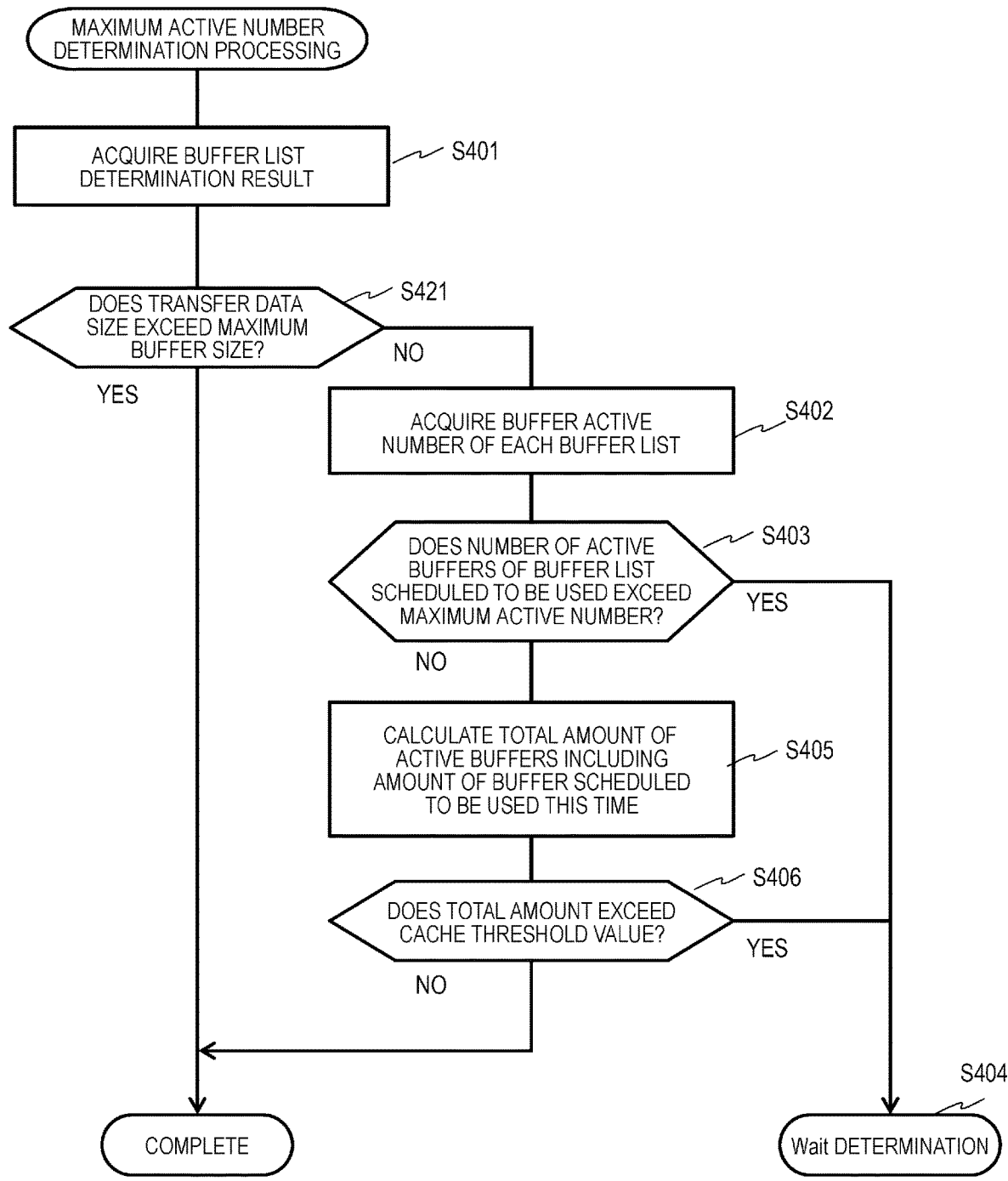
FIG. 18 illustrates a flowchart of still another example of the maximum active number determination processing.

FIG. 18 illustrates a flowchart of still another example of the maximum active number determination processing. Hereinafter, the differences from the processing example illustrated in FIG. 16 will be mainly described. In this example, when a data transfer request of which data transfer size exceeds the maximum buffer size is made, data transfer is performed without making a determination on the cache remaining amount. With this configuration, processing is made efficient.

With reference to FIG. 18, after acquiring the buffer list determination result (S401), the buffer control 306 determines whether the transfer data size exceeds the maximum buffer size (S421). When the transfer data size does not exceed the maximum buffer size (NO in S421), the buffer control 306 executes step S402 and subsequent steps. These steps are as described with reference to FIG. 16. When the transfer data size exceeds the maximum buffer size (YES in S421), the maximum active number determination processing is completed.

The present invention is not limited to the embodiments described above, and includes various modifications. For example, the embodiments described above have been described in detail in order to explain the present invention in an easy-to-understand manner, and are not necessarily limited to those including all the configurations described. Further, a part of the configuration of one embodiment can be replaced with the configuration of another embodiment, and the configuration of another embodiment can be added to the configuration of one embodiment. Further, other configurations can be added, deleted, and replaced for a part of the configurations of each embodiment.

Each of the configurations, functions, processing units and the like described above may be realized by hardware by designing a part or all of them, for example, by an integrated circuit, and the like. Further, each of the configurations, functions, and the like described above may be realized by software by the processor interpreting and executing a program that realizes each function. Information such as programs, tables, files and the like for realizing each function can be placed in a memory, a recording device such as a hard disk or a solid state drive (SSD), or a recording medium such as an IC card or an SD card.

Further, control lines and information lines indicate what is considered necessary for explanation, and do not necessarily indicate all the control lines and information lines on the product. In practice, it can be considered that almost all configurations are interconnected.

What is claimed is:

1. A network interface comprising:
a processor;
a memory; and
a cache between the processor and the memory,
wherein the processor is configured to:
secure a plurality of buffers for storing transfer data in the memory,
manage an allocation order of available buffers of the plurality of buffers,
return a buffer released after data transfer to a position before a predetermined position of the allocation order, and
allocate a plurality of buffer groups in the memory,
wherein each of the plurality of buffer groups is composed of a plurality of buffers of the same size,
wherein the plurality of buffer groups have different buffer sizes from each other, and
wherein, when a transfer data size is equal to or less than a maximum buffer size of the different buffer sizes, the processor is configured to select a buffer group having a minimum buffer size among buffer sizes equal to or greater than the transfer data size to store the transfer data.

2. The network interface according to claim 1, wherein the processor is configured to return the released buffer to a head position of the allocation order.

3. The network interface according to claim 1, wherein the processor is configured to determine whether or not a buffer is required to be allocated for new transfer data based on an amount of buffer in use.

4. The network interface according to claim 1, wherein when the transfer data size is greater than the maximum buffer size, the processor is configured to secure a new buffer area equal to or greater than the transfer data size.

5. The network interface according to claim 1, wherein when the transfer data size is greater than the maximum buffer size, the processor is configured to divide the transfer data and allocate a buffer selected from the plurality of buffer groups to the divided transfer data.

6. The network interface according to claim 1, wherein a maximum value of the number of buffers capable of being used simultaneously in each of the plurality of buffer groups is set.

7. The network interface according to claim 1, wherein the processor is configured to:
determine whether or not a buffer is required to be allocated for new transfer data based on an amount of buffer in use when the transfer data size is equal to or less than the maximum buffer size, and
skip the determination when the transfer data size is greater than the maximum buffer size.

8. The network interface according to claim 1, wherein the processor is configured to determine whether or not a buffer is required to be allocated for new transfer data based on an amount of buffer in use, and set a maximum value of the number of buffers capable of being used simultaneously in the plurality of buffers.

9. A buffer control method in a network interface including a processor, a memory, and a cache between the processor and the memory, the buffer control method comprising:

by the processor:

securing a plurality of buffers for storing transfer data in the memory;

managing an allocation order of available buffers of the plurality of buffers;

returning a buffer released after data transfer to a position before a predetermined position of the allocation order; and allocating a plurality of buffer groups in the memory, wherein each of the plurality of buffer groups is composed of a plurality of buffers of the same size, wherein the plurality of buffer groups have different buffer sizes from each other, and wherein, when a transfer data size is equal to or less than a maximum buffer size of the different buffer sizes, the processor is configured to select a buffer group having a minimum buffer size among buffer sizes equal to or greater than the transfer data size to store the transfer data.

* * * * *